US011455576B2

(12) United States Patent
Dalli et al.

(10) Patent No.: US 11,455,576 B2
(45) Date of Patent: Sep. 27, 2022

(54) ARCHITECTURE FOR EXPLAINABLE REINFORCEMENT LEARNING

(71) Applicant: UMNAI Limited, Ta'Xbiex (MT)

(72) Inventors: Angelo Dalli, Floriana (MT); Mauro Pirrone, Kalkara (MT); Matthew Grech, San Gwann (MT)

(73) Assignee: UMNAI Limited, Ta' Xbiex (MT)

( * ) Notice: Subject to any disclaimer, the term of this patent is extended or adjusted under 35 U.S.C. 154(b) by 0 days.

(21) Appl. No.: 17/525,395

(22) Filed: Nov. 12, 2021

(65) Prior Publication Data

US 2022/0147876 A1 May 12, 2022

Related U.S. Application Data

(60) Provisional application No. 63/112,870, filed on Nov. 12, 2020.

(51) Int. Cl.
*G09B 9/00* (2006.01)
*G06N 20/00* (2019.01)

(52) U.S. Cl.
CPC .............. *G06N 20/00* (2019.01); *G09B 9/00* (2013.01)

(58) Field of Classification Search
CPC ............ G06B 20/00; G09B 7/00; G09B 9/00
See application file for complete search history.

(56) References Cited

U.S. PATENT DOCUMENTS

| | | | | |
|---|---|---|---|---|
| 9,367,815 B2* | 6/2016 | Horvitz | ................... | G06N 7/005 |
| 10,552,764 B1* | 2/2020 | Carlin | .................... | G06N 7/005 |
| 11,029,651 B2* | 6/2021 | Tajima | ................ | G05B 19/4163 |
| 11,257,574 B1* | 2/2022 | Boussios | ................. | G06N 20/00 |
| 2019/0244122 A1* | 8/2019 | Li | ........................... | G06N 20/00 |
| 2019/0354853 A1* | 11/2019 | Zoldi | ........................ | G06N 3/08 |
| 2019/0370697 A1* | 12/2019 | Ramachandra Iyer | ...................... | G06N 5/045 |
| 2020/0167677 A1* | 5/2020 | Verma | ..................... | G06N 5/003 |
| 2020/0349455 A1* | 11/2020 | Wan | ..................... | G06F 16/3322 |
| 2021/0133621 A1* | 5/2021 | Ravizza | ................. | G06N 20/00 |
| 2021/0295427 A1* | 9/2021 | Shiu | ..................... | G06Q 40/025 |
| 2021/0334693 A1* | 10/2021 | Bavly | ...................... | G06N 5/04 |
| 2021/0350004 A1* | 11/2021 | Rahnama-Moghaddam | ............... | G06F 21/577 |

\* cited by examiner

*Primary Examiner* — Kurt Fernstrom

(74) *Attorney, Agent, or Firm* — Maier & Maier, PLLC

(57) ABSTRACT

An exemplary embodiment may provide an explainable reinforcement learning system. Explanations may be incorporated into an exemplary reinforcement learning agent/model or a corresponding environmental model. The explanations may be incorporated into an agent's state and/or action space. An explainable Bellman equation may implement an explainable state and explainable action as part of an explainable reward function. An explainable reinforcement learning induction method may implement a dataset to provide a white-box model which mimics a black-box reinforcement learning system. An explainable generative adversarial imitation learning model may implement an explainable generative adversarial network to train the occupancy measure of a policy and may generate multiple levels of explanations. Explainable reinforcement learning may be implemented on a quantum computing system using an embodiment of an explainable Bellman equation.

30 Claims, 13 Drawing Sheets

|    | A1 | A2 | A3 | A4 |
|----|----|----|----|----|
| S1 | 1  | 2  | -1 | 0  |
| S2 | 2  | 1  | -2 | 0  |
| S3 | 1  | 2  | -1 | -2 |
| S4 | -2 | 0  | 1  | 1  |

ARCHITECTURE FOR EXPLAINABLE REINFORCEMENT LEARNING

FIELD

An exemplary embodiment relates to the field of machine learning and reinforcement learning.

BACKGROUND

Reinforcement Learning (RL) is a branch of artificial intelligence that includes machine learning methods that learn by trial-and-error sequential decision making and, in general, learn via some concept of experience. RL is about learning to make a sequence of decisions that reward the desired behavior and punish the undesired behavior. Unlike supervised learning, which is taught by example, RL identifies and explores patterns in the environment. In other words, an RL agent does not know in advance how a particular action may affect the environment, but instead may learn that through experience.

The RL agents may be configured to find the optimal policy $\pi$ which may be found directly. A policy defines how an agent will behave. The objective of an RL agent is to select actions to maximize total expected future reward, as defined by the optimality metric on the reward stream. Commonly used optimality metrics may be the Total Reward Optimality, Overtaking Optimality, Average-Overtaking Optimality, Discounted Optimality, Gain Optimality, Bias Optimality, Blackwell Optimality, and Sensitive Discount Optimality (Mahadevan, 1996). A popular strategy for an agent is to maximize the (discounted) future rewards. Discounting is a mathematical adjustment which caters to environmental stochasticity. RL may be model-based, value-based, policy-based, actor-critic-based, or model-free.

Model-based RL may use algorithms to learn the model of the world, and then plan accordingly using the trained model. The algorithm updates the model and frequently re-plans in a planning-learning integration step.

Value-based RL may use algorithms to formulate state-to-action value pairs and learns by choosing the best action for a particular state. Exploration may be achieved via an add-on.

Policy-based RL may use algorithms to learn a stochastic policy function that maps a state to an action. The agent acts by sampling the policy and exploration is built into the method.

Actor-critic-based RL may use algorithms to combine the strengths of policy-based algorithms and value-based algorithms.

Model-free RL may use algorithms which do not try to understand the environment. Instead, model-free RL algorithms learn the policy or value function directly.

Referring to FIG. 1, FIG. 1 may illustrate a high-level overview of an RL system. The system may include an environment 202, which is the world where the system is deployed, and an RL agent 204. The state 206 of the RL agent may be a numeric representation, which is either discrete or continuous, of what an agent observes at a particular time in the environment. The set of all possible states is called state space. Additionally, episodes refer to the set of all states in between the initial state and terminal state.

An action 208 is the input provided to the environment, calculated by applying a policy to the current state. This may be discrete or continuous. The set of all possible actions is called action space. The reward 210 is a feedback signal from the environment reflecting how well the agent is performing against the goals of the task, defined by the optimality metric.

A policy 212 defines how an agent will behave. A policy $\pi$ is stationary, hence time independent. A policy $\pi$ is a distribution over actions given a particular state:

$$\pi(a|s) = P[A_t = a | S_t = s]$$

The goal of reinforcement learning may be, given the current state the agent is in, to choose the optimal action which will maximize the long-term expected reward provided by the environment. RL agents typically achieve this goal by learning and discovering the optimal policy. There are many different implementation options that allow an RL agent to learn an optimal policy, for example, using a Deep Learning Network 214 or other form of deep learning architecture or other suitable form of connectionist architecture, as illustrated in FIG. 1, or using some other suitable method.

Q-Learning is a traditional and widely used RL method, first introduced in 1989 by Walkins. It is typically used as the baseline for benchmarking RL methods. The goal of Q-Learning is to train an agent which is capable of interacting with the environment such that some function Q is approximated from a stream of data points identified by <s, a, r, s'>; where s represents the state, which is an observation from the environment, a represents the action, r represents the reward from the environment which is a measure of how good the action is, and s' represents the next state when transitioning in the environment. The Q function is equal to the expected value of the sum of future rewards with some policy $\Pi$.

$$Q^\Pi = \mathbb{E}[R_t]$$

$\Pi$ may be described as the strategy which the agent needs to follow which helps the agent choose the best action given a particular state. $R_t$ is the sum of discounted future rewards. $\gamma$ is the discount factor. The typical value of $\gamma$ may be between 0.9 and 0.99. A lower value tends to encourage short-term thinking, whereas a higher-value emphasis a long-term reward.

$$R_t = r_t + \gamma r_{t+1} + \gamma r_{t+2} + \ldots$$

The main goal behind Q-learning is to extract the optimal policy $\Pi^*$.

The objective of Q-learning is to learn the state-action value function, defined by $Q^\pi(s,a)$ whereby s represents the starting state, performing action a, followed by $\pi$. Q-learning uses any policy to estimate Q that maximizes future rewards:

$$\pi^*(s) = \underset{a}{\mathrm{argmax}} Q(s, a)$$

The Bellman equation may be used to approximate Q through <s, a, r, s'>. Such equation is used to identify the optimal value of Q.

$$Q(s, a) = r + \gamma \max_{a'} Q(s', a')$$

Q is a function known as Q-table which maps a state to an action. FIG. 2 shows an exemplary Q-table. When the state/action space is very large, the method may become unfeasible and cannot generalize to unobserved states. For instance, in a game with just 84×84 pixels, 4 consecutive images in grayscale consumes $256^{84 \times 84 \times 4}$ rows in the Q-table.

Deep RL (DRL) is the combination of RL and neural networks. Deep learning may be used to learn to approximate a function which compresses the raw input features to high-level features. In Deep Q-Learning (QL), the framework remains the same, and the Q-function is represented by a deep neural network.

$$Q(s,a,\Theta) \approx Q^*(s,a)$$

The loss function for Deep QL includes two Q functions, one for the prediction and one for the target. The target value is effectively the real value which the agent receives once the action has been taken. The loss function (squared error) for training such networks becomes as follows:

$$L = \mathbb{E}\left[\left(r + \gamma \max_{a'} Q(s', a') - Q(s, a)\right)^2\right]$$

Where $$r + \gamma \max_{a'} Q(s', a')$$

denotes the target and Q (s,a) the prediction.

Gradient descent may be applied to minimize the loss function. Double Q-Learning, in general, may utilize two value functions that are learned by assigning experiences randomly to update one of the two value functions, resulting in two sets of weights. During each update, one set of weights is used to determine the greedy policy and the other to determine its value. Other variants of Deep QL, known as Double Deep Q-Network (DQN), includes using two neural networks to perform the Bellman iteration, one for generating the prediction and another one for generating the target. It is further contemplated that the weights of the second network are replaced with the weights of the first network to perform greedy evaluation of the current policy. This helps in reducing bias which may be introduced by the inaccuracies of the Q network.

While the goal of Q learning is to approximate the Q function and use it to infer the optimal policy π*, policy gradients (PG) may instead optimize the policy space directly. The PG policy may be explicitly represented by its own function approximator, independent of the value function, and is updated according to the gradient of expected reward with respect to the policy parameters. In other words, the neural network models the probability for each action where its objective is to maximize the total future expected rewards, denoted by $E[R_t]$, where $R_t$ represents the sum of future discounted rewards. PGs tweak the parameter θ so that $E[R_t]$ is maximized.

$$\nabla_\theta E[R_t] = E[\nabla_\theta \log P(a) R_t]$$

A PG learns a stochastic policy by learning a probability distribution over actions given some observations, whereas value-based methods such as Q-learning are deterministic, unless an exploration strategy such as E-greedy is used. Other advantages of a PG are the ability to converge faster and the ability to handle continuous action spaces without which discretization, which is required for value-based methods. However, PGs may have disadvantages in that they may be sample inefficient (require more data) and may become highly unstable during the learning process. A PG may also provide poor credit assignment (state to action) pairs for delayed rewards.

In most state-of-art RL methods, a combination of a value-function estimator and a policy gradient are combined into an actor-critic algorithm. The Actor is policy-based, that is it samples action from a policy; and the Critic is value-based, and measures how good the chosen action is.

The following is a summary of existing Explainable RL (XRL) methods summarized from the survey paper by Puiutta and Veith (2020).

Programmatically Interpretable Reinforcement Learning (PIRL) (Verma et al., 2019) is an alternative to DRL. In DRL, the policies are represented by a deep neural network, making them hard, if not impossible, to interpret. The policies in PIRL, on the other hand, while still resembling the ones from DRL, are represented using high-level, human-readable programming language. The problem stays the same as in traditional RL, which is finding the optimal policy that maximizes the long-term reward, but in addition, this method applies a restriction via a policy sketch which limits the vast amount of policy targets. This method employs a method inspired by imitation learning, called Neurally Directed Program Search (NDPS). This framework first uses DRL to compute a policy which is used as a neural 'oracle' to direct the policy search for a policy that is as close as possible to the neural oracle. Doing this, the performances of the resulting policies are not as high than the ones from the DRL, but they are still satisfactory and, additionally, more easily interpretable.

In The Open Racing Car Simulator (TORCS), 5 parameters are used within the controller: acceleration, brake, clutch, gear and steering of the car, with the objective to drive the car around a race track as fast as possible. The following is an exemplary output from the system:

if (0.001−peek($h_{TrackPos}$,−1)>0) and (0.001peek
($h_{TrackPos}$,−1)>0) then 3.97*peek((0.44−$h_{RPM}$),−
1)+0.01*fold(+,(0.44−$h_{RPM}$))+48.79*(peek
($h_{RPM}$,−2)−peek($h_{RPM}$,−1)) else 3.97*peek
((0.40−$h_{RPM}$),−1)+0.01*fold(+,(0.40−$h_{RPM}$))+
48.79*(peek($h_{RPM}$,−2)−peek($h_{RPM}$,−1))

A programmatic policy for acceleration, automatically discovered by the NDPS algorithm. hRPM and hTrackPos represent histories for the RPM and TrackPos sensors, respectively.

Shu et al. (2017) proposes a framework for multi-task RL using hierarchical policies that addresses the issues involving different skills by reducing them into simpler subtasks. This framework is based on and extends multi-task RL with modular policy design through a two-layer hierarchical policy that incorporates fewer assumptions introducing the concept that a complex task could be decomposed into smaller sub-tasks, where each sub-task could be fulfilled by an already learnt policy. The model is hierarchical because each top-level policy (e.g., 'stack x') includes several lower levels of actions ('find x'→'get x'→'put x'). The main differential factor of this method is the fact that each task is described by a human instruction, and agents can only access learnt skills through these descriptions, making its policies and decisions inherently human-interpretable. To boost the model performance, the method also employs a stochastic method for modelling temporal relationships and priorities of tasks, however without making use of causal models. This method, when compared to learning a flat policy that maps a state directly to an action, may provide an interpretable way of learning multi-task RL with only minimal human supervision during training to decide which skills to learn.

Linear Model U-Trees (Liu et al., 2018) is a method that approximates the predictions of an accurate, but complex model by mimicking the model's Q-function using Linear Model U-Trees (LMUTs). An LMUT is learned using an on-line algorithm that is well-suited for an active play setting, where the mimic learner observes an ongoing interaction between the neural net and the environment. A U-tree takes a set of observed feature/action values as input and maps it to a state value (or Q-value). Unlike supervised learning, a DRL model is not trained with static input/output data pairs. A DRL model interacts with the environment by selecting actions to perform and adjusting its policy to maximize the expectation of cumulative reward. (Liu et al., 2018) present two methods:

The first method is experience learning, which applies mimic learning to the Q function in DRL models. The mimic dataset is created by observing signals I and actions a during the DRL process. A signal I is a vector of continuous features that represents a state. Then, the corresponding signal and action pairs <I,a> are fed into the Q function to obtain the corresponding output Q, which creates an experience training dataset.

The second method is active play. Compared to Experience Training, Active Play does not require recording data during the training process of DRL models. This is important because: (1) many mimic learners have access only to the trained deep models, (2) training a DRL model often generates a large amount of data, which requires much memory and is computationally challenging to process, and (3) the Experience Training data includes frequent visits to suboptimal states, which makes it difficult for the mimic learner to obtain an optimal return.

Tree-based planning methods can also be combined with learned models. The muZero algorithm presented in Schrittweiser et al. (2020) is a particularly effective way of iteratively learning a model that predicts the quantities that most relevant to planning, namely the reward, action-selection policy and the value function. Prior work to muZero such as TreeQN, which learns abstract MDP models, value iteration networks, which learns local MDP models, and value prediction networks, which learn an MDP model grounded in real actions, did not offer a policy prediction solution, and only utilized value predictions.

Madumal et al. (2019) aims to provide explanations of how the agent's behavior is based on the knowledge of how actions influence the environment. This method builds on the advantage of the prominent theory that humans develop and deploy causal models to explain the world around them and have adapted a structural causal model (SCM) to mimic this for a model-free RL system. SCMs represent the world with random exogenous (external) and endogenous (internal) variables, some of which might exert a causal influence over others. These influences can be described with a set of structural equations, giving a Structural Equation Model (SEM).

Madumal et al. (2019) utilize SCMs to represent action influence models, where each edge in the SCMs is associated with an action. In the action influence model, each state variable has a set of structural equations: one for each unique incoming action. For example, a variable $A_n$ is causally influenced by the casual precursor variables, say S and B, only when action $A_m$ is executed. The structural equation $F_{A_n} \cdot F_{A_m}$ (S, B) can thus be used to capture this relationship. In Madumal et al. (2019) illustrates an example of an action influence graph of an agent playing the game "STARCRAFT II". The causal chain for the counterfactual action 'Why not Ab (build barracks)?' may be described as W→B→An→[Du, Db]. For an agent in a particular state of play in the game, an explanation to the question 'Why not build barracks (Ab)?' would be 'Because it is more desirable to do action 'build supply depot (As)' to have more Supply Depots (S) as the goal is to have more Destroyed Units (Du) and Destroyed buildings (Db)'. This explicit link between RL agent action histories and the construction of an SCM is rather universal and is adopted in this work for the creation of SEM equations.

The process to generate an action-influence based explanation includes three steps: the first step is an action influence model in the form of a DAG and/or SEM. The second step involves estimating counterfactuals through multi-varied regression during the RL agent training process. The third step involves generating an explanation by either providing the causal chain, the counterfactual chain, or a contrastive comparison between the causal and counterfactual chains. This method has an advantage of ensuring that only the minimum variables necessary for the explanation are included, rather than all the vectors of all variables of all nodes. In a contrastive action-influence based explanation, the chain differences are utilized to construct an explanation of why the current event happened instead of the counterfactual events.

Madumal et al. (2019) also define the optimal state variable values for a counterfactual action to be selected. The goal as interpreted by humans is defined as the immediate reward of the respective state.

The objective of Madumal et al. (2019) is to derive an SEM from an SCM derived from an RL agent action history. Our method aims to create an interpretable white-box model for the computation of the Q-value function and also utilizes the explanations themselves as part of the agent's policy and overall behavior.

Quantum Reinforcement Learning (Dong et al., 2008) may describe a quantum version of reinforcement learning which makes use of quantum wave collapse and qubit superpositions to model reinforcement learning in a quantum-probabilistic manner.

SUMMARY

According to at least one exemplary embodiment, a method, system, and computer program product for an explainable reinforcement learning (XRL) architecture may be shown and described.

XRL introduces the concept of explanations as part of the RL agent model and optionally the world/environment model. An exemplary XRL agent may incorporate explanations as part of its state space and/or its action space, giving it a richer exploratory space that combines agent generated and learnt explanations with environmentally derived and learnt explanations.

An exemplary embodiment may include at least four possible embodiments that introduce explainability in a reinforcement learning (RL) system.

A first exemplary embodiment is based on the widely used Bellman equation and formulates an explainable version of the equation which makes use of an explainable state and an explainable action as part of the explainable reward function. Explainable RL for both deterministic and stochastic applications may be defined, making it possible to extend all existing non-explainable RL systems that utilize the Bellman equation and its derivatives to be extensible to an XRL system. It is further contemplated that such an exemplary embodiment may utilize at least one suitable explainable multi-stage optimization technique, explainable temporal difference optimization technique or explainable multi-stage dynamic programming technique as a replacement or augmentation to the explainable Bellman equation.

A second alternative embodiment may use an XRL induction method which makes use of an experience dataset to learn a supervised white-box model, using an explainable architecture x, where x an XAI model (XAI), interpretable neural network (INN), explainable transducer transformer (XTT), explainable GAN (XGAN), explainable auto-encoder/decoder (XAED), explainable spiking network (XSN), explainable memory network (XMN) or logically equivalent or similar architectures, which matches and mimics the behavior of the original RL system. The experience dataset may be a record of states, actions and rewards stored in a sequential manner.

A third exemplary embodiment may implement explainable generative adversarial imitation learning (XGAIL). XGAIL trains the occupancy measure of a policy, using an explainable generative adversarial network (XGAN) architecture, to be as close as possible to the occupancy measure of the policy of the expert. XGAIL may generate multiple levels of explanations, which may include partitioning information, internal coefficients of the white-box model and feature attributions of the input features which refer to the trajectories of the policy of the expert.

A fourth exemplary embodiment may include a quantum version of XRL (XQRL) and the quantum computing version of the explainable Bellman equation, together with details on how it may be practically implemented on a quantum computing system.

Exemplary embodiment may be further embodied using different alternative RL techniques to achieve a working XRL system. The exemplary embodiments presented here merely represent examples and implementation techniques for illustrative purposes. Variations of other RL techniques may be implemented and/or combined in an exemplary embodiment.

An exemplary embodiment differs from the method proposed by Madumal et al. (2019), by implementing deep explainable Q-Learning (DXQ-Learning). In an exemplary embodiment, a white-box model is used to compute the Q value function. The white-box model may illustrate how good a certain action is, given a certain state and following a certain policy. The explainable architecture x, where x∈{XAI, XNN, XTT, XRL, XGAN, XAED, XSN, XMN, INN} or logically equivalent or similar architectures, as well as other derivatives such as CNN-XNN, PR-XNN or other similar variants, enables explanations, for example by backtracking the output to the input features, and using partitioning information.

An exemplary embodiment may implement the physical implementation details of Dong et al. (2008) and may utilize similar concepts on how reinforcement learning may be implemented on a quantum computing system to obtain a Quantum Reinforcement Learning (QRL) agent. An exemplary embodiment may extend the work of Dong et al. (2008) by adding explanation capabilities to the QRL agent, resulting in an Explainable QRL (XQRL) agent. The quantum eigenstates of an XQRL agent, together with the quantum unitary operator for XQRL may be presented in an exemplary embodiment to enable efficient implementation on a quantum computing system.

While the prior art uses some form of a linear equations for explainability, the exemplary XRL methods presented herein differ in several aspects. The introduction of the explainable Bellman equation enables the explainable state and explainable action to form part of the reward function, which also provides an explainable reward. Explanations of the XRL learning process may lead to better safety and control mechanisms as they may allow for a better understanding of the inner working of the system which may require adjustments, monitoring and automatic/manual interventions.

XRL systems are fully compatible with XNN/INN systems, hence they also inherit all their advantages. For example, XNN/INNs may utilize and are fully compatible with all current DL libraries and architectures, allowing them to take advantage of all performance advancements available for DLs. XNNs/INNs allow interpretable models to be created in a flexible manner. They may be trained at once without the need to have an external induction step and may be trained in phases or by incorporating induction for parts of the model. XNNs/INNs may be utilized for explainable imitation learning. Once an XRL model becomes explainable with XNNs/INNs, models may be fused via partitioning. An exemplary XRL method might not require additional post-hoc processing for generating explanations. The integrated XNNs/INNs may compute a prediction and explanation in a single feed-forward pass, without the need for further processing or perturbation. XNNs/INNs are capable of outputting a ruleset, and the rules can be used to interpret and validate the model of the agent in a global manner such that it has a holistic view of the environment. Rules are in the form of if-then statements which are also simple to comprehend, as well as compact through the combination of linear equations. INNs may be initialized either by transferring knowledge from a black-box model, or by transferring knowledge from an existing ruleset, which has been trained externally. Transfer learning may improve the speed and quality of the resulting interpretable model. In DQL, INNs may provide a quick solution to enable explanations without the need to retrain the entire system. Since XNNs/INNs may incorporate partitions and rules, it is possible to embed human knowledge within the neural network. Thus, INNs can mix human knowledge and machine-generated knowledge through the relevance estimators. This enables RL agents to have the human knowledge embedded and combined with the machine generated knowledge. XNN/INN architecture may be combined into a bigger deep learning system. For example, they may be integrated into an existing Q-learning function which is based on deep learning.

XRL is compatible with Behavioral Models and their behavior can thus be verified, analyzed, and guaranteed to be within pre-specified boundaries and limitations, allowing them to be embedded safely within larger autonomous or semi-autonomous systems or deployed in a standalone manner. XRL can be implemented in a variety of embodiments including hardware-only implementations and a mix of software and hardware.

The introduction of a quantum version of XRL (XQRL) and the quantum explainable Bellman equation allows an exemplary embodiment to be implemented in quantum computing systems. XQRL systems implemented on quantum computing architectures may be significantly more time efficient than XRL systems implemented using classical computer architectures. XQRL can be combined with XRL systems seamlessly and may remain compatible with XNN/INN systems and other explainable systems, such as XSNs and XMNs.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

Figure 8:
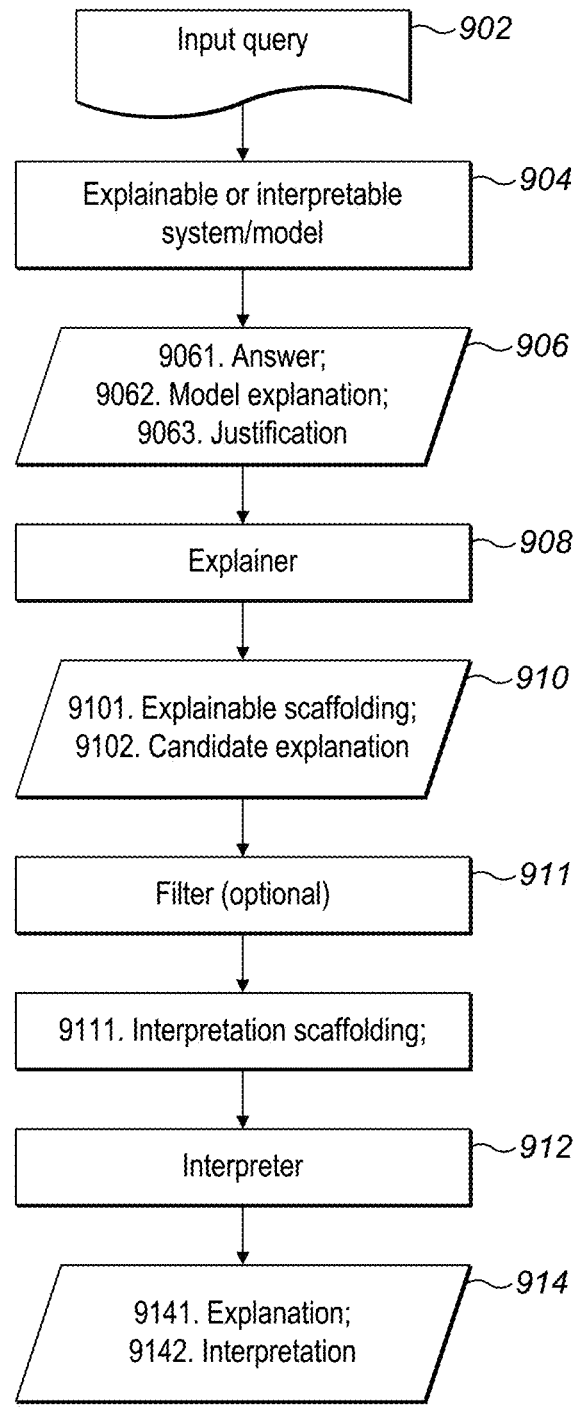
FIG. 8 illustrates an exemplary Explanation Process and Outputs.

FIG. 8 presents an exemplary explanation generation pipeline that starts off with an Input Query 902, representing a data sample, scenario or other question which is currently being examined, which is then processed through three exemplary components: the Explainable or Interpretable System/Model 904, the Explainer 908, and the Interpreter 912. Each of the three exemplary components may produce different outputs which may be consumed by the next component in the process pipeline.

The Explainable or Interpretable System/Model 904 may produce an Answer 9061, together with an optional Model Explanation 9062 of that Answer, and optionally a Justification 9063 of the Answer and/or its Model Explanation.

The Explainer 908 may produce an Explanation Scaffolding 9101, together with an optional Candidate Explanation 9102. In an exemplary embodiment, the Candidate Explanation is generated as a result of processing of the Explanation Scaffolding and can be used in the process of evaluation of the contents of the Explanation Scaffolding in some form of iterative process involving unsupervised or supervised learning and optimization. The Explanation Scaffolding 9101 may be converted into an Interpretation Scaffolding 9111 with the use of an optional Filter 911. The Interpreter 912 may produce an Explanation 9141, together with an optional Interpretation 9142 of that Explanation.

The end result 914 of the explanation process, which may include an Explanation and/or its Interpretation, may be consumed by either a human user, another application, another system component forming part of a larger embodiment, or some other automated system.

Note that FIG. 8 is just one exemplary pipeline chosen for illustrative purposes, and an exemplary embodiment may be implemented in various alternative manners that may omit or combine one or more components, and/or execute them in a different order and sequence. For example, in an exemplary embodiment, it may be contemplated that both the explainer 908 and interpreter 912 can be omitted together with their respective outputs 910 and 914.

In another exemplary embodiment, the explainer 908 and interpreter 912 can be combined together as a single component that produces a combination of the outputs 910 and 914.

Any exemplary embodiment that produces at least an Answer 9061 and its Explanation 9141 from an input query 902 may be logically equivalent to the exemplary pipeline in FIG. 8.

It may be further contemplated that in the case of a global (i.e., model level) explanation or a query-less application embodiment, even the input query 902 can be omitted without losing the logical equivalence to the exemplary pipeline in FIG. 8.

Some combination of outputs in FIG. 8 may be combined together or omitted altogether in an exemplary embodiment. For example, the Justification 9063 may be deemed optional in some applications, while the Interpretation 9142 may be left for a human interpreter or expert to create instead of an automated system.

An interpretable machine learning system may be thoroughly understood and have its functionality and internal behavior (model interpretability), answers (output interpretability) and explanations interpreted and understood by an Interpreter. The final Explanations accompanying the Answers do not need to have further post-hoc processing on their core structure, although additional cycles of processing to add syntactic and semantic information and to contextualize and personalize the explanation is acceptable, as illustrated in FIG. 8, where the Explanation 9141 goes through different stages of transformation and enhancement before it gets to a final stage.

In an exemplary embodiment of the exemplary system shown in FIG. 8, an Explanation-Filter-Interpretation (EFI) model may be used as a practical implementation solution within the context of an Explanation Interpretation Generation System (EIGS).

In a first exemplary embodiment, XRL introduces explanations to the actions and the environment model. In terms of behavioral FSM each (state, action) pair can have a constant connection point prior to making the action after selecting the state, during the action, and after the action is made. The combination of events and actions with the environment may be considered a simulation. Realistic simulation may include collecting the right amount of sensor/event data in order to take the optimal action.

For RL and XRL, another connection point may be before, during, and after the selection of the action under a policy π. This is applicable when action space and/or the state space is either discrete or continuous.

Figure 1:
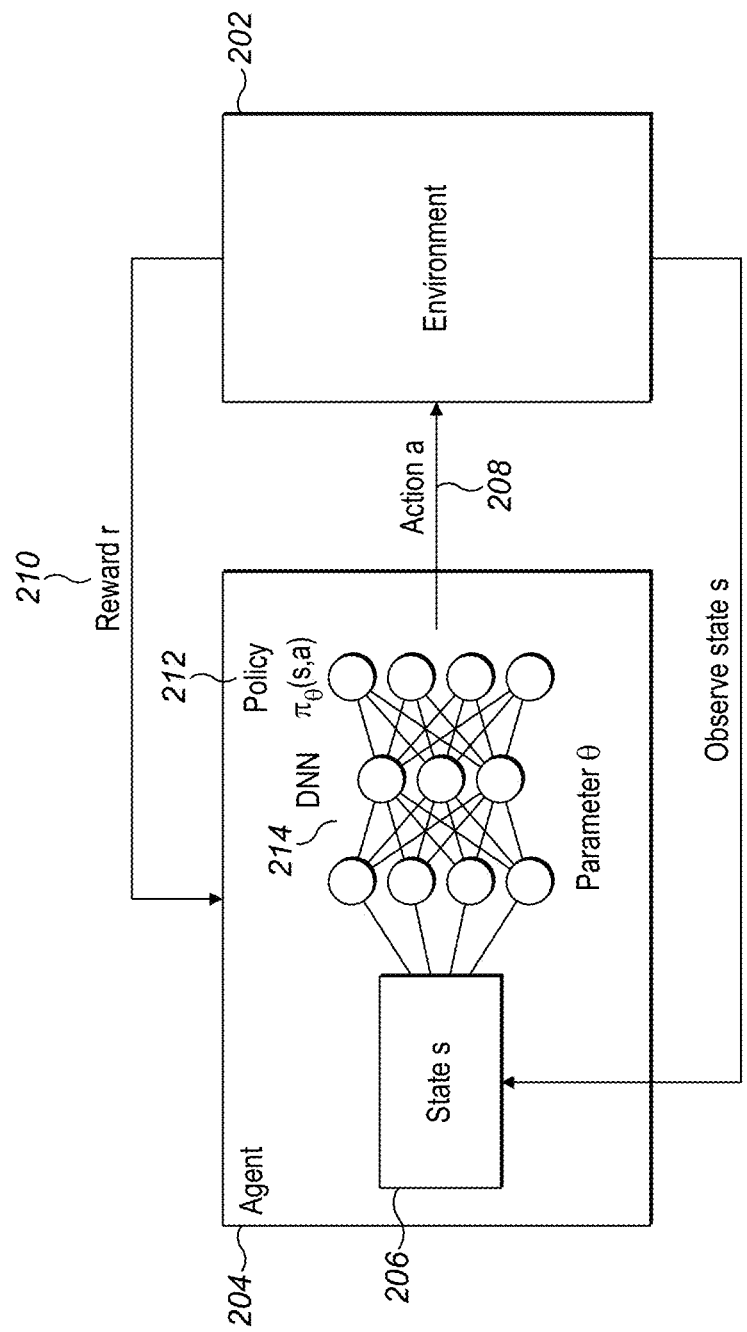
FIG. 1 illustrates a high-level reinforcement learning system.
Figures 2, 3:
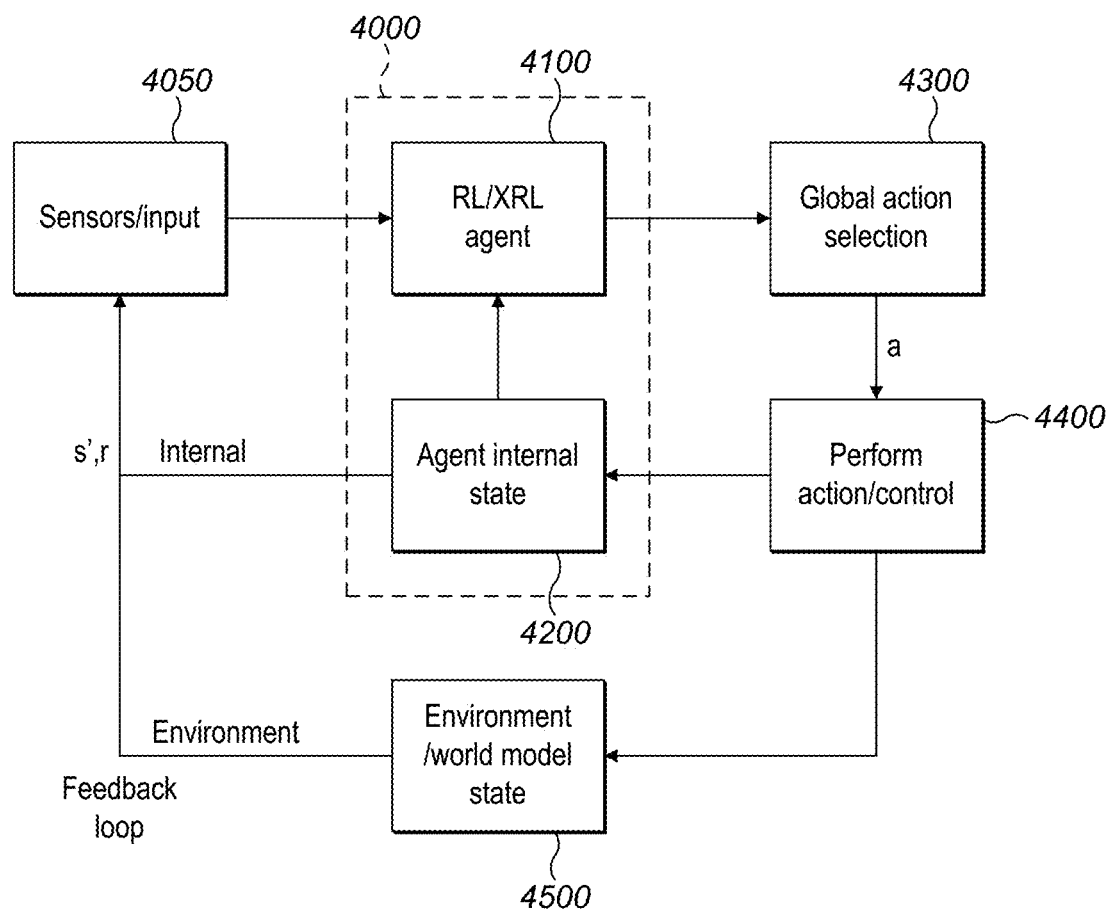
FIG. 2 illustrates an exemplary Q-table.
FIG. 3 illustrates an exemplary RL Agent FSM/Markov Process.

The model may have additional connection points, depending on the structure of the model itself. Referring now to FIG. 3, FIG. 3 shows an exemplary RL agent FSM/Markov Process. Process 4000 may include an action a for the current state s, which leads to state s'. The Process may be typically modelled using a Markov Decision Process (MDP) or a Partially Observable MDP (POMDP). The reward may be denoted by r. The RL agent may have a simulation of the environment used in the action selection process that may be hidden or explicit, depending upon the implementation. Note that an XRL agent, unlike an RL agent, will have explanations influencing r in addition to the standard RL observations.

An exemplary XRL may include explanations x as part of the model/environment. The world model 4500 can give back a partial or full explanation about the state s' and the reward r, defined as $x_e$. Referring back to FIG. 8, partial explanations may correspond to stage 9101 and full explanations may involve up to stage 9141 in an exemplary explanation pipeline. It may be contemplated that a more advanced XRL modification, leading to an Interpretation XRL (IXRL) agent, also utilizes the Interpretation (such as what may be in stage 9142 in an exemplary explanation pipeline, such as the one shown in FIG. 8), as part of the state s'. It may be contemplated that XRL and IXRL are used interchangeably. Any exemplary embodiment that applies to an XRL may instead implement an IXRL, and vice-versa.

Another exemplary embodiment may include an action space, which may introduce an associated action explanation, that is a, $x_a$, which may denote an action and an explanation of the action, respectively. The same considerations corresponding to s' regarding partial and full explanations, together with an optional interpretation, may apply to the action space.

The policy Π, may become $\Pi_x$, in an XRL, representing an explainable mapping, such that:

$$\prod\nolimits_x \approx s \to a, x_a$$

$$\prod\nolimits_x \approx s, x_s \to a, x_a$$

The Bellman equation for deterministic environments may be given by:

$$Q(s, a) = r + \gamma \max_{a'} Q(s', a')$$

The value of a given state is equal to the maximum action. The state which maximizes the value for a given state is chosen. The function may take the reward r of the optimal action a in state s, and adds a multiplier of gamma, which is the discount factor which diminishes the reward over time. γ, denotes the discount factor. A value of 1 means that there is no discounting. In an exemplary embodiment, a lower value encourages short-term thinking, whereas a higher value emphasizes long-term rewards. s' denotes the next state after an action is taken. This process may continue until the terminal state is reached.

The relationship by a given state-action pair (s,a) to its successors (s',a') may be described by the Bellman equation, which defines the optimal Q-value (Q*), when no uncertainty exists (deterministic):

$$Q^*(s, a) = r(s, a) + \gamma \max_{a'} Q(s', a')$$

Stochasticity may be modelled as follows:

$$Q(s, a) = \sum_{s',r} p(s', r | s, a)\left[r + \gamma \max_{a'} Q_x * (s', a')\right]$$

Where p(s',r|s,a) defines the conditional probability of a reward given for a state and action.

The explainable version of the Bellman equation may be similar to the non-explainable version, with the addition or replacement of an explainable state $x_s$ and an explainable action $x_a$. An explainable action $x_a$ may consume and/or generate explanations for the current state s. The explanations generated for all states may be stored in the explanation state space $x_s$. The relationship by a given explainable state, action pair/tuple (s, $x_s$, a, $x_a$) to its successors (s', $x_s'$, a', $x_a'$) may be given by the following exemplary equation which defines the optimal explainable $P_x$-value ($Q_x$*) as follows, when no uncertainty exists (deterministic).

$$Q_x * (s, x_s, a, x_a) = r(s, x_s, a, x_a) + \gamma \max_{a'} Q_x(s', x_s', a', x_a')$$

Stochastic problems may be modelled as follows:

$$Q_x * (s, x_s, a, x_a) = \sum_{s',r} p(s', x_s', r | s, x_s, a, x_a)\left[r + \gamma \max_{a'} Q_x * (s', x_s', a', x_a')\right]$$

The explainable operator, which defines the expected reward for an agent in a state s and having explanation $x_s$ performing an action a while providing an explanation $x_a$ for its action is defined as follows:

$$A_x(s, x_s, a, x_a) = Q_x(s, x_s, a, x_a) - V_x(s, x_s)$$

Further, it may be noted that an XRL agent may differ from an RL agent in the sense that an XRL agent action may act purely on the explanation space $x_s$ without affecting the agent environment. A chain of purely explanatory actions is thus possible with an XRL agent, something that is not possible with a non-explainable RL agent. This unique XRL feature is useful in all situations where the explanation or the interpretation itself, justification, model fitting, scenario reasoning, planning, or other similar characteristic/criterion is necessary to achieve an optimal or sub-optimal solution to the problem or goal currently being solved by the agent.

In a similar manner, explainable Q-learning may be defined as follows:

$$Q_x(s, x_s, a, x_a) = r(s, x_s, a, x_a) + \gamma \max_a Q_x * (s', x_s', a', x_a')$$

It may be contemplated that deep explainable Q-learning (DXQ-learning or DXQL) may implement an explainable architecture to represent $Q_x$ instead of using a $Q_x$ table. An XRL embodiment may use an explainable architecture x instead of a black-box model to represent $Q_x$, where x∈{XAI, XNN, XTT, XRL, XGAN, XAED, XSN, XMN, INN} or logically equivalent or similar architectures, as well as other derivatives such as CNN-XNN, PR-XNN or other similar variants. It may also be contemplated that a distributed explainable architecture (DEA) may also be used to implement $Q_x$.

In some practical XRL implementation cases, a DXQL system may be faced with non-converging Q-values or Q-values that become too large, in which case a number of mitigation strategies may need to be applied to the explainable Q-learning function. One such strategy would be to minimize $Q_x$ when it gets too large using some appropriate measure that compares $Q_x$ against a static scalar value or some dynamic value computed from a function based on the difference between the value of $Q_x$ and some value based on the current values within the DXQL agent's Q-learning weights. It is further contemplated that some form of regularization weight β can be applied at each step of the $Q_x$ calculation to give equations of the form $\beta * Q_x(s', x_s', a', x_a') + L^2$ where β ranges from [0 . . . 1] and may be either a constant or computed via some appropriate function or estimator.

The incorporation of explanations may enhance XRL agent performance by increasing the hypothesis space of the simulatable models that an XRL agent is capable of representing. Standard RL agents are capable of representing simulatable models that essentially consist of observed and predicted states pairs, with the difference between them providing a measure of accuracy or fit of the RL/XRL model. Explanations in XRL agents may be seen as performing two main functions: (i.) explaining the actions and decisions of the agent, in an audit-like manner; (ii.) using the explanation model itself as a form of predictive function that acts using the explanatory model space together with the observed space. The explanatory model space is the combination of the normal RL state space together with the explanation space $x_s$. The observed space is the normal RL state space together with the observations arriving from the environment and any other applicable external entities or objects. Unlike an unexplained latent space approach, the explanatory model space is fully known and explainable without any loss of information, and is fully traceable at all steps taken by the XRL agent leading from its input to its output. This latter predictive use of explanation models allows XRL agents to be able to add another comparison pair to their simulatable models, that of observed states and "predicted via an explanation model" states, with the difference between them providing a measure of the plausibility of the XRL model. This use may be enhanced further with the XRL agent use of causal models and simulator constraint models, such as in our XRL XGAIL model, where explanatory models may be used to implement plausibility based deconfounding. The addition of plausibility-based objectives in XRL agents may make XRL agents more suitable for use in exploration, observation, and interventional interactions with realistic environments such as the real physical world.

XRL agents differ substantially from standard RL agents by simultaneously maximizing both the standard RL rewards and maximizing the explanation fit in its environment. The XRL agent use of explanation of action and reward, and its subsequent predictive use gives rise to more intelligent behavior that not just merely optimizes for rewards (as in RL) but rather optimizes for environmentally plausible and understandable rewards (in XRL). The explanatory model space may also provide a practical solution for environments that exhibit partial observability. XRL agents may also be able to model the environmental context around behavioural decisions in a more efficient manner than standard RL agents. Typical practical applications are likely to encounter context-dependent data distributions, that place contextual constraints on the XRL agent behavior.

In an exemplary embodiment of an XRL agent in an autonomous vehicle controller, the cost of misclassifying a potentially unsafe state for an autonomous vehicle depends on the whether the vehicle is idling statically or moving at speed, and whether the vehicle can subsequently have enough time to brake or perform evasive maneuvers. The reversibility or irreversibility of actions is also an important consideration that can be handled more practically and efficiently with XRL agents in comparison to standard RL agents. The explanatory model may be used to determine the reversibility/irreversibility of actions and determine the likely range or cost or reward or impact of the consequences of such actions. For example, an XRL agent may be made to exhibit conservative behavior if a very high cost or an illegal state is associated with irreversible actions. In another example, a balance between the two types of actions may be used to make an XRL agent capable of taking irreversible actions when the reward of taking such an irreversible action and its consequences far outweigh the reward of taking reversible actions only. These reversibility and consequence estimations may be used to refine the XRL agent behavior, making it integrate more practically and safely with its environment. Such estimations may be implemented and presented via a suitable Identify-Assess-Recommend-Resolve (IAR) framework. It is further contemplated that explanatory models may allow multiple XRL agents to interact and collaborate (or vice-versa, compete) with each other more effectively. XRL agents in multi-agent environments may utilize their explanatory models to model the expected behavior of other agents, thus taking into account game-theoretic like scenarios and considerations prior to executing an action. It is further contemplated that an XRL agent in a meta-learning environment may utilize its explanatory model to generalize more efficiently as it interacts with multiple environments, using the explanatory model derived from the previously interacted environments in a novel environment. The inherent environment plausibility checks that are carried over via the explanatory model may boost the XRL agent performance, especially when the novel environment retains some characteristics of the previously interacted environments, which is likely to be expected in real-life applications and embodied AI applications, as the real-world environment retains the same base characteristics (like real world interactions governed by the laws of physics) regardless of the application.

In an exemplary embodiment, an XRL agent may utilize an explanatory model in conjunction with an iterative Monte Carlo Search Tree (MCST) solution. In an XRL agent, the MCST policy targets take into consideration the explanatory model, unlike all existing known MCST solutions, of which muZero represents the current state-of-the-art. Unlike muZero, an XRL MCST search may utilize a novel fourth objective in addition to muZero's three objectives (minimize error between predicted and search policies, minimize error between predicted and target values, minimize error between predicted and observed reward): minimize error between the predicted policy, value targets and rewards obtained via the explanatory model and the observed policy, value targets and rewards. Using the notation in Schrittweiser et al. (2020), if the predicted reward, value and policy values using an explanatory model X using a history time window h are denoted by $\widehat{r_t^k}$, $\widehat{v_t^k}$, $\widehat{p_t^k}$ respectively and the observed reward, value and policy values are denoted by $u_{t+k}$, $z_{t+k}$, $\pi_{t+k}$ respectively, the XRL explanation model loss function $l_h^X$ (can be added as a novel fourth loss term and is defined as follows:

$$l_h^X(\beta_r l^r(u_{t+k}, \widehat{r_t^k}), \beta_v l^v(z_{t+k}, \widehat{v_t^k}), \beta_p l^p(\pi_{t+k}, \widehat{p_t^k}))$$

Where $\beta_r$, $\beta_v$, $\beta_p$ are weights for each part of the three sub-terms for the explanatory model derived reward, value and policy value differences and h can range from 0 to t. This novel explanation model loss function adds an element of plausibility checks in MCTS search for XRL agents that has been missing from standard RL agents.

Figure 12:
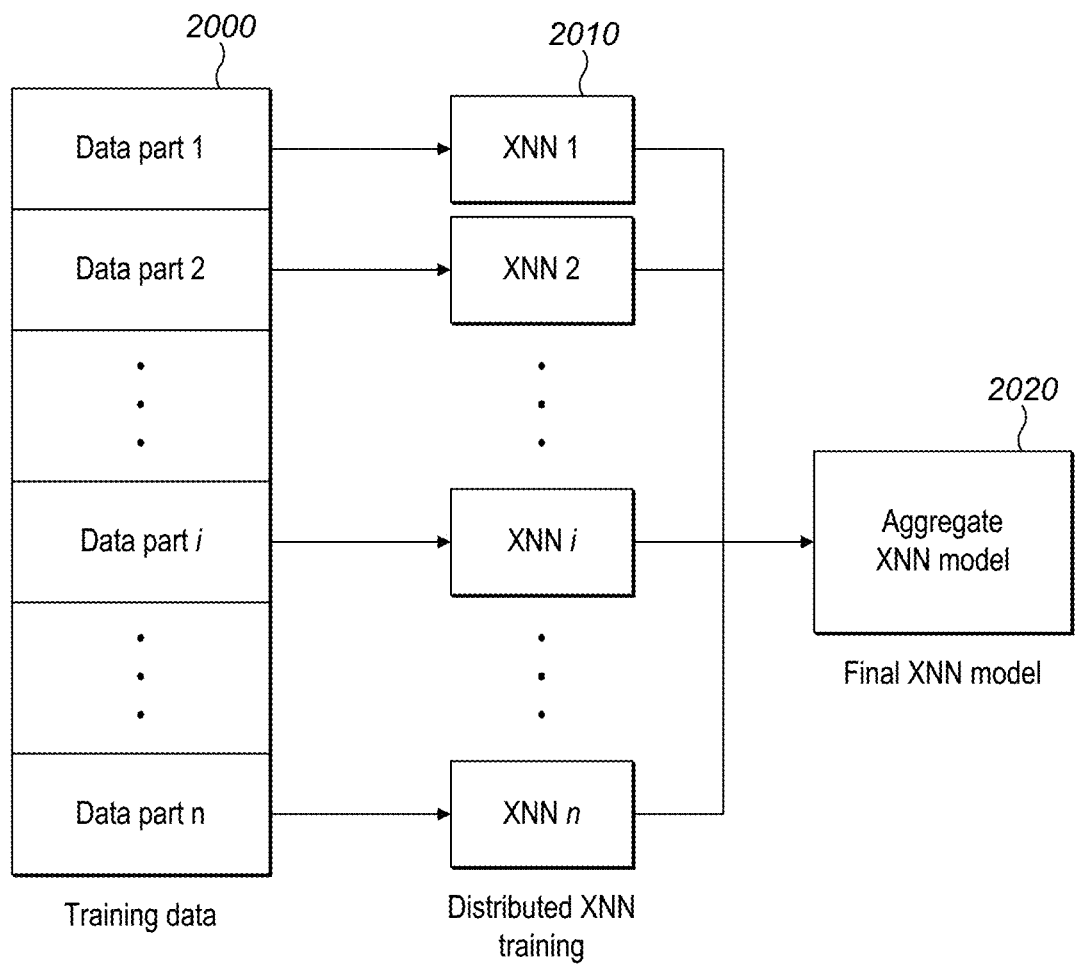
FIG. 12 illustrates a high-level architecture of a distributed XNN training system.

XRL agents may be implemented in a distributed manner using a distributed explainable architecture (DEA). A DEA may contain multiple explainable architectures $DEA_m$, such that m ∈ $\{x_1, x_2, \ldots, x_n\}$, where x∈{XAI, XNN, XTT, XRL, XGAN, XAED, XSN, XMN, INN} or logically equivalent or similar architectures, and these models may be processed in parallel. FIG. 12 illustrates a high-level architecture of an exemplary distributed training system, where $DEA_m$ refers to the parallel $DEA_n$ explainable models 2010, where $DEA_n$ is the number of models in such framework.

A DEA may split the dataset into multiple subsets 2000 of data in order to train the explainable architectures $DEA_m$. The models trained in distributed framework DEA may be aggregated 2020 during the training phase by calculating the average (or weighted average) from the parallel models. The aggregate model may be formed based directly on the weights of the model, rather than from the result of the individual models. It is further contemplated that the aggregate model may have some form of dynamic class balancing to modify the weights of the model to handle issues like stratification and class imbalance. Distributed explainable architecture DEA may be useful for large datasets where the training data cannot fit within the resource constraints of a single machine.

A DEA may include hybrid models, such that the models in such architecture are a mix of x, where x∈{XAI, XNN, XTT, XRL, XGAN, XAED, XSN, XMN, INN} or logically equivalent or similar architectures. An exemplary embodiment may implement multiple different models. For example, one data part may implement an XNN while another data part of the same system may implement an XAI explainable model. The models may then be combined to create an aggregate model. The aggregate model may be equal to x, where x∈{XAI, XNN, XTT, XRL, XGAN, XAED, XSN, XMN, INN} or logically equivalent or similar architectures or may be a hybrid model implementing multiple different models. A DEA may incorporate multiple independent models where one model, once trained, can work independently without the need to rely on the full distributed architecture, which is optimized primarily for training purposes. In an exemplary embodiment, a distributed XRL agent may utilize a DEA to train efficiently on large datasets or to train in parallel across large environments. In a further exemplary embodiment, an ensemble of XRL agents, or an environment that hosts multiple XRL agents may utilize a DEA to enable practical implementation. In a further exemplary embodiment, a DEA may be used to implement a combination of multiple co-operating and/or competing XRL agents. It is further contemplated that the DEA message passing, or communication network may be used to optimize the XRL agent behaviors using game theory or some form of multiple-objective or multi-agent objective optimization.

A Structural Causal Model (SCM) may include three exemplary components: U, V and $f$. U may correspond to variables that are external to the causal model and independent and/or are not a descendant of any other variables. U variables are referred to exogenous variables. V may refer to variables that are dependent and/or are a descendant of at least one exogenous variable. V variables are referred to endogenous variables. The component $f$ refers to a set of structural equations. The structural equations may be utilized to derive the endogenous variables V from U∪V. A Structural Causal Model SCM may be associated with a directed acyclic graphical (DAG) model. A graphical model G contains N nodes and E edges. The graphical model $G_N$ contains a node for each exogenous variable in $SCM_U$, where U∈$\{U_1, \ldots, U_n\}$, and a node for each endogenous variable in $SCM_V$, where V∈$\{V_1, \ldots, V_n\}$. The edges $G_E$ of such graphical model refer to the function that are used to derive the endogenous variables $SCM_V$.

An Explainable Structural Causal Model (XSCM) may refer to a structural causal model (SCM) with a modification to the computation of the structural equations $f$. The structural equations $f$ in a XSCM are computed using an explainable architecture x, where x∈{XAI, XNN, XTT, XRL, XGAN, XAED, XSN, XMN, INN} or logically equivalent or similar architectures. The utilization of an explainable architecture for the computation of the structural equations $f$ enables explainable relationships between the exogenous variables U and the endogenous variables V. Such explainable relationships between causal variables are not possible when using black-box models (Madumal et al, 2019) (Kocaoglu et al, 2017) in a structural causal model. The use of white-box models also enables integration of Human Knowledge Injection and collaborative knowledge discovery methods to be seamlessly fused with results obtained in supervised or unsupervised modes in the discovery of the structural equations $f$. Human knowledge injection (HKI), system knowledge injection and collaborative knowledge discovery methods are another type of input for the computation of the structural equations $f$. The coefficients $\theta$ of the explainable architecture x within a structural equation may be modified to enforce specific rules. It is further contemplated that an Explanation Structure Model (ESM) may be utilized in an XRL system implementation. ESMs consist of four main parts: (i.) an explainable model, such as an XNN, XTT, or other suitable explainable models; (ii.) a Statistical Structural Model (SSM) that models statistical relationships; (iii.) Causal Structural Model (CSM) that models causal relationships and that may be implemented by an XSCM or XGAIL model or other suitable causal models; and (iv.) Symbolic Structural Model (SSM) that models symbolic and logical relationships and that may be implemented in the form of rules, symbolic logic, or some suitable formal language.

In an exemplary embodiment, an XRL agent may use an XSCM to learn a pre-defined causal graph. Experience replay or prioritized experience replay (Schaul et al., 2016) may be used by RL agents in order to recall past experiences. A past experience exp may be defined as a four-tuple vector $<s_t, a_t, r_t, s_{t+1}>$. $s_t$ may refer to the state at time step t. $a_t$ may refer to the action taken at time step t. $r_t$ may refer to the reward at time step t. $s_{t+1}$ may refer to the next state from state $s_t$. The reward $r_t$ may be partially based on the explanations generated from the structural equations $f$, of an XSCM. An RL agent that utilizes experience replay may generate a dataset $\exp_{dataset}$, where $\exp_{dataset} = \{\exp_1, \ldots, \exp_n\}$. The dataset $\exp_{dataset}$ may be used to train the structural equations $f$ of an explainable structural causal model XSM.

The computation of the structural equations $f$ in an explainable structural causal model XSCM may be computed using an explainable architecture x, where $x \in \{XAI, XNN, XTT, XRL, XGAN, XAED, XSN, XMN, INN\}$ or logically equivalent or similar architectures. An explainable architecture may construct multiple types of model interpretation to better understand the context $\vec{u}$, and cause of an event $\delta$ in the explainable structural causal model XSCM. The context $\vec{u}$, may refer to the unique values of the exogenous variables in the explainable structural causal model. The cause of an event $\delta$ may refer to a set of endogenous values V that cause an event $\delta$ to occur, such that there exists another set of endogenous values V in which event $\delta$ does not occur.

There may be three types of exemplary model interpretation that can be output by an XSCM system: basic interpretation, explanatory interpretation, and meta-explanatory interpretation. A basic interpretation may refer to a prediction output o that can be understood by the sub-component. An explanatory interpretation is represented by a 2-tuple vector <o, w> which may refer to a prediction output o combined with a model explanation w for such predicted value, that can be understood by the sub-component. A model explanation may include coefficients $\theta$ of the explainable architecture x that may be utilized to explain the feature importance of the input features for a given observation. A meta-explanatory interpretation may be represented by a 3-tuple vector <o, w, j> and may contain the prediction output o, the model explanation w and justification of the model explanation j. The model justification j provides additional information about the assumptions, processes and decisions taken by the explanation system that were taken into consideration to produce the model explanation.

An XRL architecture may be incorporated in a behavioral model framework. A behavioral model BM may allow for fusion of conditional constraints in order for the activation of a trigger t, hence multiple conditional constraints may be based on the graphical causal model in an XRL embodiment. An event may be fired upon the activation of the conditional constraints for a particular trigger within the behavioral model to execute a terminal action or a feedback action to update internal coefficients of a causal model, update internal coefficients of an explainable architecture x, or update a sub-component within the behavioral model BM.

In an exemplary XRL agent, such as the exemplary implementation illustrated in FIG. 3, a BM can be flexibly incorporated via a combination of constraints on each or any combination of 4000, 4050, 4100, 4200, 4300, 4400, and 4500, together with any combination of their transitions, in any order. It may be contemplated that an exemplary embodiment may implement any other contemplated reinforcement learning technique, process, or component.

Behavioral models are used herein for illustrative purposes. It may be contemplated that an exemplary embodiment may implement any suitable equivalent. For example, the use of BMs may be flexibly substituted with a behavioral model hierarchy (BMH). Any reference to a BM can be substituted with a BMH and vice-versa.

It is further contemplated that a combination of BMs and XRLs provides further assurance and guarantees of behavior that add to the trustworthiness and auditability of XRL agents. It is also further contemplated that BMs may provide a practical solution for XRL in the face of environments that provide partial observations.

An exemplary XRL embodiment may construct explanation scaffolding from the output produced by the explainable architecture x and use it to illustrate the results to the interpreter to assist in understanding such how the model arrived at the prediction. An interpreter may be the end-user, a sub-component within the XRL embodiment, or a function approximation within the exemplary XRL. As previously described, there are three types of exemplary model interpretation: basic interpretation, explanatory interpretation, and meta-explanatory interpretation. A basic interpretation may refer to a prediction output o that can be understood by the sub-component. An explanatory interpretation is represented by a 2-tuple vector <o, w> and refers to a prediction output o combined with a model explanation w for such predicted value, that can be understood by the sub-component. A model explanation may include coefficients $\theta$ of the explainable architecture x that may explain the feature importance of the input features for a given observation. A meta-explanatory interpretation may be represented by a 3-tuple vector <o, w, j> which may include the prediction output o, the model explanation w and justification of the model explanation j. The model justification j provides additional information about the assumptions, processes and decisions taken by the explanation system that were taken into consideration to produce the model explanation.

Although some examples may reference one or more of these specifically (for example, only XAI or XNN), it may be contemplated that any of the embodiments described herein may be applied to XAIs, XNNs, XTTs, XGANs, XAEDs, XSNs, or XMNs interchangeably. Another exemplary embodiment may relate to bias detection in Interpretable Neural Networks (INNs) and related grey-box models, which may be a hybrid mix between a black-box and white-box model. An exemplary embodiment may apply fully to the white-box part of the grey-box model and may apply to at least some portion of the black-box part of the grey-box model. It may be contemplated that any of the embodiments described herein may also be applied to INNs interchangeably.

The exemplary embodiments may be implemented directly as a hardware circuit, which may be implemented either using (i.) flexible architectures like FPGAs, or (ii.) more static architectures like ASICs, analogue/digital electronics, photo-electronics, or optical processors, or (iii.) neuromorphic architectures, spintronics, or memristors that may be more suited for the hardware implementation of connectionist models, or (iv.) quantum computing hardware.

In an exemplary embodiment, XRLs may be implemented using FPGAs, which may be useful for applications involving high throughput and hardware acceleration advantage while maintaining flexibility that is usually associated with software implementations.

In an exemplary embodiment, XRLs may be implemented using ASICs, which may be useful for applications involving mass production of similar products. Such an implementation may have high performance and throughput, possibly at a cost of having less flexibility.

In an exemplary embodiment, XRLs may be implemented using discrete components, which may be useful for small size or compact XRLs. Cost and robustness considerations may make this type of implementation attractive, for example, when high power systems are involved or when a simple XRL is needed for basic control or safety monitoring.

In another exemplary embodiment, XRLs may be implemented using neuromorphic hardware. Neuromorphic hardware also intertwines memory and processing in a similar manner to spintronics. Hardware neuromorphic XRL implementations may be highly efficient while having most of the advantages and flexibility similar to that of a general computing architecture without actually needing a general computing architecture. Neuromorphic XRL implementations may efficiently implement explainable models like XNNs and/or INNs used within the XRL, while enabling possible non-neural components of XRL agents to be implemented efficiently too, for example, by utilizing the neuro-symbolic architecture of the XNN conditional network. Interpretable models such as INNs, enable such architectures to be made understandable by presenting a model that can mostly be further presented to people in the form of rules and/or workflows. This surface representation form can be edited and then seamlessly reconverted back into the neural, connectionist format that is needed for neuromorphic hardware. Such an exemplary embodiment provides a practical solution for editing, adding, and deleting relevant information and consequently changing the behavior of neuromorphic devices in a controlled, reliable, and replicable manner.

In another exemplary embodiment, XRLs may be implemented on neuromorphic hardware that employ spiking neurons rather than the more common activation function-based neurons. Spiking neurons within an XRL implementation may increase the power efficiency and processing throughput very significantly, making some practical applications feasible that would otherwise be unfeasible with non-spiking neurons.

In another exemplary embodiment, XRLs may be implemented using spintronics or memristors. Spintronics intertwine memory and computing components leading to a potentially more efficient hardware implementation since there does not need to be much, if any, transfer of memory values, weights, etc. during operation. Memristors offer similar advantages and have the advantage of being non-volatile. Spintronic and/or memristor XRL implementations may have similar characteristics to an FPGA implementation if they are reprogrammable. Non-reprogrammable spintronics or memristors may have similar characteristics to ASICs. XRLs can be efficiently implemented using spintronics or memristors by converting all the different layers and neurons in any connectionist-based part of the XRL together with any state-machine or tabular-based part of the XRL to a spintronic or memristor circuit. Spintronic implementations of XRLs and related XRL variants may be particularly efficient in practice due to the conflation of memory and processing that is available in a spintronic circuit. Memristor implementations of XRLs may be particularly power efficient as their non-volatile weight storage makes it possible to aggressively switch off part or all of a memristor based XRL during operation. Faster data access and the elimination or reduction of having computationally expensive data transfer requests over a data bus can significantly improve the performance of XRLs and all their variants.

In an exemplary embodiment, XRLs and Quantum XRLs (QXRLs) may be implemented on quantum computing devices. It is contemplated that an XRL or QXRL implemented on a quantum processing system will have rules that are similar to classical explainable models with the addition of quantum specific extensions. For example, such an extension may allow for the specification of quantum annealing effects and their correct interpretation. In another example, a quantum-specific extension may allow for the correct interpretation of multiple qubit states, qubit basis states, mixed states, Ancilla bits, and other relevant quantum effects due to entanglement and/or decoherence. In another example, a quantum-specific extension may allow for the introduction of quantum logic specific operators and/or hardware logic gates within an XNN, such as quantum controlled-not (CNOT), controlled-swap (CSWAP), Ising gates (XX, YY, ZZ gates), Pauli gates, Hadamard gates, Toffoli gates and other relevant quantum logic operations that may be combined serially or in parallel. In an exemplary embodiment, an XRL or QXRL implemented on quantum computing hardware, may utilize suitable quantum algorithms, such as those based on quantum Fourier transforms, amplitude amplification, quantum walks and so on. In an exemplary XRL or QXRL embodiment on quantum devices, the Bernstein-Vazirani, Simon's algorithm or the Deutsch-Jozsa algorithm may be utilized to predict and refine the boundary conditions of the XRL agent action policy. In another exemplary quantum embodiment, Shor's algorithm, Quantum Phase estimation algorithm, Grover's algorithm, Quantum Counting, Quantum Hamiltonian NAND trees, or the HHL algorithm may be used to speed up the constraint, condition, event, and trigger parts of an XRL or QXRL agent integrated with a Behavioral Model (BM). In another exemplary embodiment on quantum devices, a hybrid solution may be utilized, such as the QAOA algorithm, VQE eingensolver, CQE eingensolver, and quantum matrix inversion to speed up part of the processes involved, for example by using Gaussian estimation processes, or linear system of equations solvers that utilize quantum processing to give faster results both during XRL/QXRL agent training and when operating normally in the environment.

In an exemplary embodiment, XRLs may be implemented in conjunction with Explainable Neural Networks (XNNs). XNNs are a new type of Artificial Neural Networks (ANNs) that are inherently interpretable and explainable. Interpretability is built within the XNN architecture itself, yet it functions like a standard neural network, eliminating the need to apply additional techniques or processing for interpreting the result of a neural network. XNNs may compute both the answer and its explanation in a single feed-forward step without any need for simulations, iterations, perturbation, etc. XNNs are also designed to be easily implementable both in software but also in hardware efficiently, leading to substantial speed and space improvements.

The architecture behind an XNN works by combining multiple local models that are arranged in a hierarchical structure, eventually being combined in one global model. Local models analyze a small area within the entire search space. In an exemplary embodiment, when a transaction is analyzed in a local manner, a linear model is sufficient to explain the model. In another exemplary embodiment, a non-linear model may be necessary. On the other hand, global models are about understanding the model with a holistic view. The hierarchical structure represents a level of detail in between, at different levels of detail and scale. In an exemplary embodiment, the XNN hierarchical structure may be tree-like, graph-like, hypergraph-like in nature or based on simplicial complexes. XNNs work by merging the multiple hierarchical partitions represent the local zones and multiple local models to explain each partition, such that, combined, they make up a global model. Additionally, XNNs go beyond linear data, and may cater to non-linear data by embedding transformations within the neural network itself, while retaining explainability. Each layer, neuron, and connection within an XNN may have a precise and well known and understandable function, unlike standard ANNs that are a black-box. XNNs are thus the first ever known fully white-box ANNs, giving rise to new category of neural networks that are understandable and interpretable. The inherent white-box nature of XNNs make them an ideal component for use within XRL agents.

Figure 4:
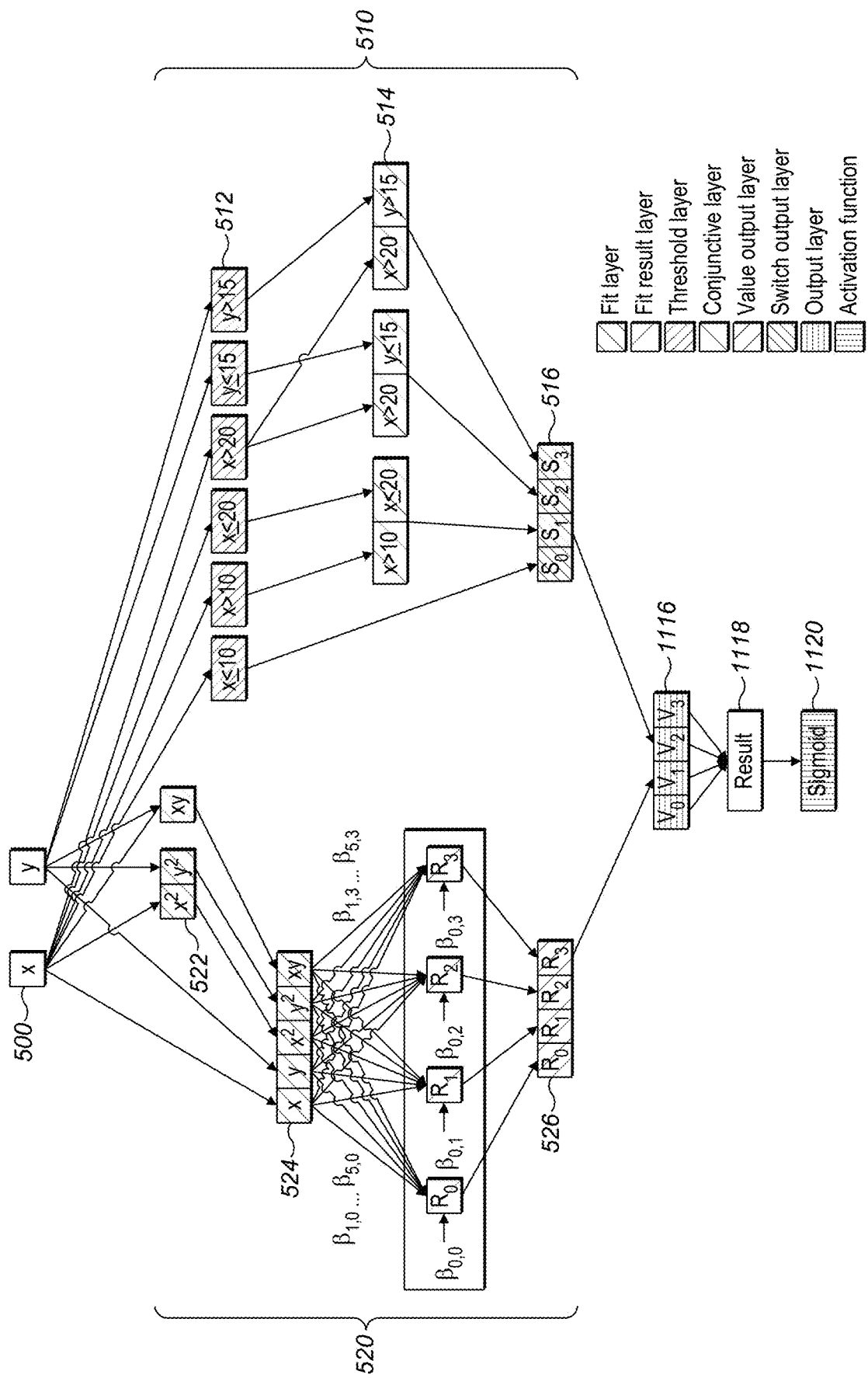
FIG. 4 illustrates an exemplary XNN.

FIG. 4 illustrates a schematic diagram of an exemplary high-level XNN architecture. An input layer 500 may be inputted, possibly simultaneously, into both a conditional network 510 and a prediction network 520. The conditional network 510 may include a conditional layer 512, an aggregation layer 514, and a switch output layer (which outputs the conditional values) 516. The prediction network 520 may include a feature generation and transformation 522, a fit layer 524, and a prediction output layer (value output) 526. The layers may be analyzed by a selection and ranking layer that may multiply the switch output by the value output 1116, producing a ranked or scored output 1118. The explanations and answers may be concurrently calculated by the XNN by the conditional network and the prediction network. The selection and ranking layer may ensure that the answers and explanations are correctly matched, ranked and scored appropriately before being sent to the output.

The processing of the conditional network 510 and the prediction network 520 is contemplated to be in any order. Depending on the specific application of the XNN, it may be contemplated that some of the components of the conditional network 510 like components 512, 514 and 516 may be optional or replaced with a trivial implementation. Depending on the specific application of the XNN, it may further be contemplated that some of the components of the prediction network 520 such as components 522, 524 and 526 may be optional or replaced with a trivial implementation.

For optimization purposes, the XNN may also be implemented with both the conditional network 510 and the prediction network 520 together with all their components merged together into one network. This merged conditional and prediction network may also be merged together with the output 1118. This optimization will still result in a logically equivalent XNN, which may be faster for feed forward processing but may suffer when it comes to training via backward propagation and gradient descent techniques.

An XNN may combine the results from the switch output layer and the value output layer. The example depicted in FIG. 4 is logically equivalent to the following exemplary ruleset:

$$f(x,y) = \begin{cases} \text{Sigmoid } (\beta_{0,0} + \beta_{1,0}x + \beta_{2,0}y + \beta_{3,0}x^2 + \beta_{4,0}y^2 + \beta_{5,0}xy), & x \le 10 \\ \text{Sigmoid } (\beta_{0,1} + \beta_{1,1}x + \beta_{2,1}y + \beta_{3,1}x^2 + \beta_{4,1}y^2 + \beta_{5,1}xy), & x > 10 \wedge x \le 20 \\ \text{Sigmoid } (\beta_{0,2} + \beta_{1,2}x + \beta_{2,2}y + \beta_{3,2}x^2 + \beta_{4,2}y^2 + \beta_{5,2}xy), & x > 20 \wedge y \le 15 \\ \text{Sigmoid } (\beta_{0,3} + \beta_{1,3}x + \beta_{2,3}y + \beta_{3,3}x^2 + \beta_{4,3}y^2 + \beta_{5,3}xy), & x > 20 \wedge y > 15 \end{cases}$$

The ruleset may be found following the activation function 1120. The exemplary architecture in FIG. 4 may begin with an input 500. The input may then be used as inputs to the conditional network 510 and the prediction network 520. As illustrated in FIG. 4, the prediction network may contain a feature generation and transformation layer 522, a fit layer 524, and a value output layer 526. The value output layer 526 may provide equations which correspond to rules which weigh different features of the inputs. Further, the input 500 may be used as input to the conditional network 510, as illustrated in FIG. 4. Again, the conditional layer 512 and aggregation layer 514 may produce conjunctive rules or other logical equivalents or partitions which are represented in the switch output layer 516.

The outputs of the value output layer 526 and the switch output layer 516 may be combined. Once the output has been formed, a sigmoid or other activation function 1120 may be applied to the result 1118, depending on the application.

XNNs may present an intuitive way to construct interpretable models, while still utilizing the power of ANNs and related methods such as deep learning. Once the model is trained through back-propagation or a similar method, the resulting neural network can be used to serve predictions and the inner structure of the XNN can be used to construct the rules.

In an exemplary embodiment, XRLs may be implemented in conjunction with Interpretable Neural Networks (INNs). INNs may provide an architecture which can automatically generate an explanation using existing deep learning techniques. INNs can utilize existing software infrastructures and hardware used for neural networks and may also remain fully compatible with backpropagation training techniques.

The INN architecture may include a feature transformer which converts the input to some hidden features, and a number of relevance estimators which transform the hidden features to feature weights. The feature weights are then combined with the transformed input in order to extract the attribution of each input transformed feature. The resulting feature attributions are then aggregated for the result. Feature attribution may be extracted at different levels. In the simplest form, attribution may be linked directly with the original inputs. In other cases, such as CNNs, feature attribution may also be computed for higher-level features which are typically found in kernels and filters. Additionally, INNs may split the model in various partitions, thus enabling a higher-level of flexibility and interpretability, by enabling a mixture of local or segmented explainability using a partition hierarchy that may be graph-like or hypergraph-like in nature or that uses simplicial complexes. In some cases, INNs are also capable of providing global explainability.

Figure 5:
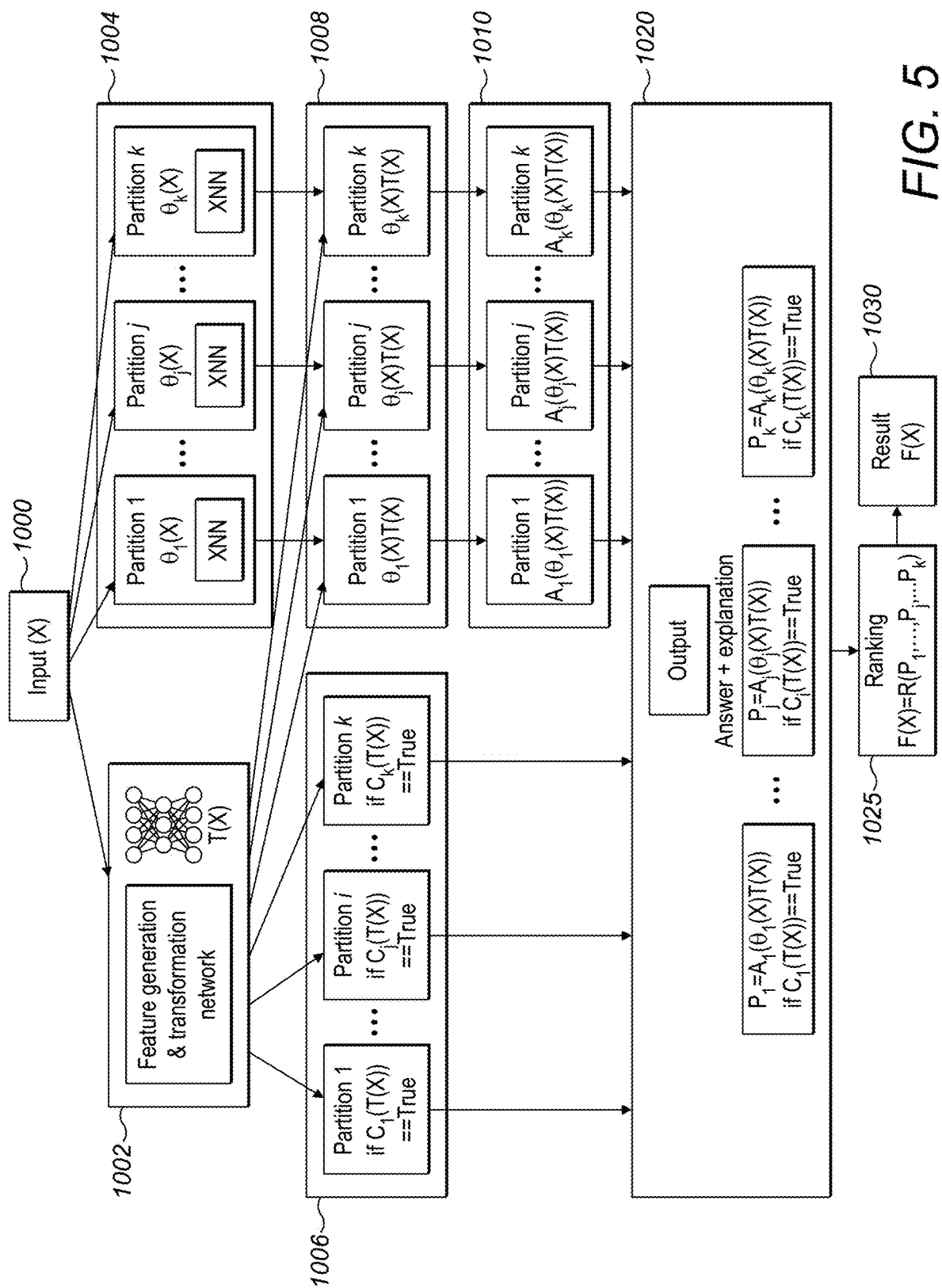
FIG. 5 illustrates an exemplary INN.

Referring to FIG. 5, an exemplary INN architecture may start with some input vector X 1000. The input may then be connected to a feature generation and transformation network 1002 and to k relevance estimators 1004. The transformed features may be abstract or high-level features which could have been computed using a deep neural network such as a CNN, a non-linear mathematical function such as polynomial expansion, or some other form of generated features, which may be discrete or continuous. The relevance estimator may calculate the coefficient of each transformed feature.

In mathematical terms, the transformation network may be denoted as a function $T(X)$. Similarly, $\theta_j(X)$ represents the relevance function of the $j^{th}$ partition. If $X \rightarrow T(X)$ returns a vector with z transformed dimensions, then $X \rightarrow \theta_j(X)$ also returns a vector with z coefficients, or relevance weights. It is assumed that $|T(X)|=|\theta_j(X)|=z$.

INNs may be flexible enough to allow modelling of complexity through various options and configurations. The functions $X \rightarrow T(X)$ and $X \rightarrow \theta_i(X)$ may be a deep neural network which may make it possible to model complex abstract features. It may be noted that the combination of $T(X)$ and $\theta_i(X)$ may represent various embodiments of explainable models which are possible to implement with the INN architecture.

An exemplary embodiment may include a conditional network 1006. The conditional network 1006 may evaluate rules in the form of IF-conditions in order to activate one or more partition. The output of $C_i(X)$ may be binary or multi-valued. It may be noted that the partitions may be static or dynamic, and they may be discovered either through an external partitioning process or through a connected neural network. It may also be noted that INNs may also function with only one partition, that is for all values of X, $C_i(X)$ is always one (1). This is equivalent to having zero partitions. In this case, there is no need to apply a partitioning method to find suitable partitions.

An exemplary embodiment may also include a feature attribution step or component 1008, where the neural network computes the feature attribution of each transformed feature which is activated by the associated partition. The relevance attribution may multiply the result of the computed coefficient with the transformed feature. In mathematical terms, feature attribution 1008 computes $\theta_j(X)T(X)$ for the jth partition. The output of layer 1008 serves the basis of explanation generation. The values from this layer may be used to generate feature attribution graphs, heatmaps, textual explanations or other form of explanations.

An exemplary embodiment may include an aggregation layer or component 1010, where the neural network aggregates the results for each partition. This may be the predictive result for the activated partition. In mathematical terms, the aggregation function may be defined by $A_j(\theta_j(X)T(X))$. In an exemplary embodiment, the aggregation function may be a simple summation of the feature attributions. This becomes equivalent to a linear function, at least functioning in a local manner, such that the result $R_j = \theta_j(X)_1 T(X) + \ldots + \theta_j(X)_z T(X)$.

Finally, the switch layer 1020 may select the activated partition. If more than one partition is activated, some ranking function 1025 may need to be applied. The result is generated through the layer 1030.

Figure 6:
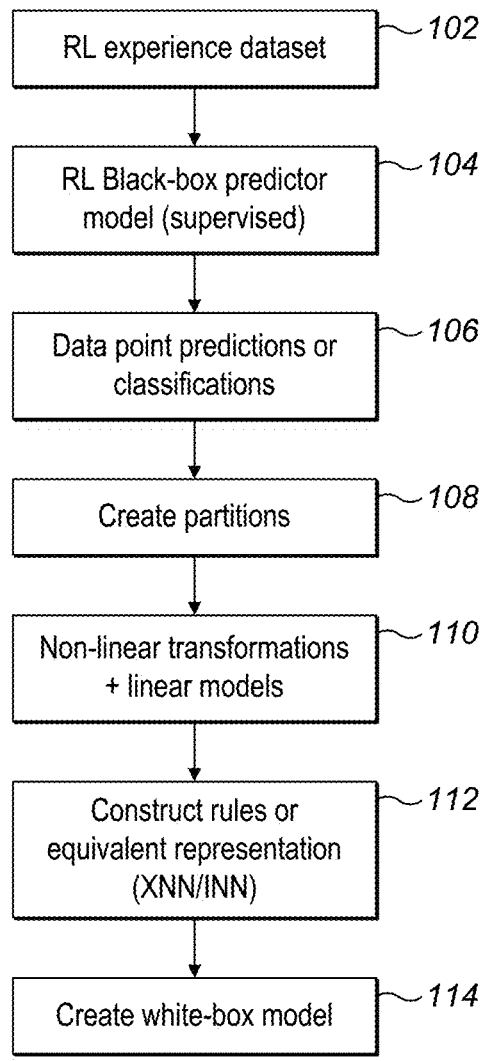
FIG. 6 illustrates an exemplary XRL Induction Method.

In another exemplary embodiment, a black-box RL system may be induced to produce an explainable version of the RL system. The induction method may be used to create a white-box version of the RL system using an exemplary explainable architecture x. FIG. 6 may illustrate an exemplary method for extracting an explainable white-box model of a black-box RL system by treating an exemplary RL system as a supervised learning problem whereby the predicted label is the prediction of future rewards, given the current state s and some action a. The system may implement an experience dataset, which effectively is a record of states, actions, and rewards stored in a sequential manner. The dataset may be created by the agent during the training of the RL system 102. An exemplary method may be similar to behavioral cloning; the main difference is that the output is different. Instead of only having events, actions, and rewards, which would be identical to the clone, the output also includes an explanation.

In an exemplary embodiment, an XRL agent may implement action and policy rules and interact with the environment using input from a combination of digital-analogue hybrid system, optical system, quantum entangled system, bio-electrical interface, bio-mechanical interface, or suitable alternative in the conditional, IF part of the rules and/or a combination of a Localization Trigger, Answer Context, Explanation Context or Justification Context. In such an exemplary embodiment, the IF part of the rules may be partially determined, for example, via input from an optical interferometer, or a digital-analogue photonic processor, or an entangled-photon source, or a neural interface. Such an exemplary embodiment may have various practical applications, including medical applications, microscopy applications and advanced physical inspection machines.

In an exemplary embodiment, an XRL agent may implement an adaptive education system that utilizes the explanatory model space to better adapt to different student learning rates. It is contemplated that such an exemplary XRL agent may be implemented in conjunction with an augmented reality, virtual reality, video game environment or metaverse system to provide explainable educational recommendations, actions and assessments. It is further contemplated that such an exemplary XRL agent may utilize a behavioural framework (BM) to provide a safe environment for its users. It is further contemplated that such an exemplary embodiment may be extended to other application areas, such as industrial task training, interactive job training and instructional systems.

In a further exemplary embodiment, an XRL agent may implement a combination of workflows, process flows, process description, state-transition charts, Petri networks, electronic circuits, logic gates, optical circuits, digital-analogue hybrid circuits, bio-mechanical interfaces, bio-electrical interface, quantum circuits or suitable implementation methods.

Quantization and other hardware-oriented compression techniques may be applied on hardware XRL implementations for faster and more efficient performance. Explainable models within an XRL agent may have sparse compression methods in addition to pruning methods applied to achieve better power efficiency.

The use of an experience dataset is similar to the Linear Model U-Trees approach (Liu et al., 2018). The main difference between the prior art is the actual induction process which may incorporates a white-box explainable model within an XRL agent. Additionally, through the use of XNNs within XRLs, an exemplary system may also model sequence data through LSTMs or PR-XNNs, something which the prior art cannot achieve simply by using U-Trees. XRLs using XNNs also enable complex transformations, such as convolutions through CNN-XNNs, while retaining end-to-end lossless explainability.

Perturbated variations of the set of synthetic data may also be created so that a larger dataset may be obtained without increasing the need for additional experience/synthetic data, thus saving resources. The experience dataset 102 may then be loaded into a black-box regressor or classifier 104 as an input.

An exemplary supervised ML model may mimic the functionality of the RL agent. Such models may, however, be trained using any ML technique, including but not limited to deep learning. The black-box model may also utilize advanced transformations such as sequence models and LSTM, or convolutions such as CNN-XNN.

In the case of Deep Q-Learning, parts of the neural network used for the Q-function may also be incorporated as transformation step in the black-box model. It may also be contemplated that the black-box model in some cases may be optional, and a white-box model may be trained directly by creating an XNN, XSN, XGAN, XAED, XMN or an INN or similar explainable model directly, and therefore a black-box may not be required.

When time-based imitation learning on the experience dataset, or some other similar form of sequence-based imitation learning, is required in general, a predictive version of the induction method may be needed. An exemplary predictive version of the induction method may create a white-box version of the RL system using a predictive version of the explainable architecture x. For example, if the predictive induction method is used to create a white-box model based on the XNN architecture, the resulting white-box model may be a predictive XNN (PR-XNN). Some transformations of RL systems using the predictive induction method can be used to provide further insight into the RL system. For example, by analyzing the rules in a PR-XAI model, the behavior of the RL system may be expressed as a system of rules that contain time-based or sequence-based relations and references in both a human and machine readable and interpretable manner. The transformation into a symbolic machine learning system may enable both humans and machines to make further improvements and gain insights by applying well established symbolic techniques, processes and algorithms that may not be otherwise possible with non-symbolic machine learning systems.

Still referring to exemplary FIG. 6, the underlying structure of a black-box model may not be important to an exemplary induction method. Although some component may be used as part of the white-box model (such as CNN layers), an exemplary induction method primarily deals with the output of the black-box model, without analyzing the inner structure of the black-box model. Instead, the synthetic data may be input into the RL black-box predictor model 104, and the output can be recorded as data point predictions or classifications 106. Since a large amount of broad synthetic data was loaded as input, the output data point predictions or classifications may provide a global view of the black-box algorithm.

An exemplary method may continue by aggregating the data point predictions or classifications into hierarchical partitions 108. Rule conditions may be obtained from the hierarchical partitions.

In an exemplary embodiment, the process to find the partitions, or the boundary of the partitions, may be an external function defined by Partition(X). Partition(X) may be a function configured to partition similar data and may be used in order to create rules. The partitioning function may include a clustering algorithm such as k-means, entropy, or a mutual information (MI) based method.

The hierarchical partitions may organize the output data points in a variety of ways. In an exemplary embodiment, the data points may be aggregated such that each partition represents a rule or a set of rules. The hierarchical partitions may then be modeled using mathematical transformations and linear and non-linear models. Any transformation may be used. An exemplary embodiment may apply a polynomial expansion or some other transformations, including causal mappings. It is further contemplated, that the transformation function may be a pipeline of transformations, including but not limited to polynomial expansions, rotations, dimensional and dimensionless scaling, Fourier transforms, Walsh functions, state-space and phase-space transforms, Haar and non-Haar wavelets, generalized L2 functions, fractal-based transforms, Hadamard transforms, Type 1 and Type 2 fuzzy logic, knowledge graph networks, categorical encoding, topological transforms of Kolmogorov/Frechet/Hausdorff/Tychonoff spaces, difference analysis and normalization/standardization of data. The transform function pipeline may further contain transforms that analyze sequences of data that are ordered according to the value of one or more variables, including temporally ordered data sequences.

Further, a linear fit model may be applied to the partitions 110. Additional functions and transformations may be applied prior to the linear fit depending on the application of the black-box model, such as the softmax or sigmoid function. The calculated local models obtained from the partitions may be used to construct rules or some other logically equivalent representation 112 such as XNN as shown in FIG. 4 or INN as shown in FIG. 5. The rules may be stored in any medium. For example, the rules may be stored as mathematical equations or may be represented using first order symbolic logic. Storing the rules as such may allow the extracted model to be applied to any known programming language and may be applied to any computational device.

Finally, the rules may be applied to the white-box model 114. The white-box model may store the rules of the black-box model or of the original RL system directly, allowing it to mimic the function of the black-box RL system while simultaneously providing explanations that the black-box model may not have provided. Further, the extracted white-box model may parallel the original black-box model in performance, efficiency, and accuracy.

In another exemplary embodiment, an INN may be created from a black-box model which mimics the RL agent, i.e., the model which takes the state-action pair and returns the expected reward for a given action. This may be accomplished by converting the input it to some hidden or latent state, which is then used for generating the result. When applying transfer learning, the final layer, or a number of layers from the end of the black-box model may be excluded. The embedded network structure may include fixed or non-trainable weights to allow training of the added layers to train faster. It may be contemplated that an exemplary embodiment may also include complex layers such as LSTM, Word Embeddings/Word2Vec, CNN layers, and other layer variants whose choice depends on the particular embodiment and solution being sought.

When applying transfer learning, the resulting INN may be grey-box. That is, some of its components may be interpretable and it may have an explainable output. However, unlike XNNs, the original black-box predictor might not be discarded. Thus, INN may be used for local interpretability. Global interpretability may be limited or restricted to a specific module or partition. Such functionality may still be useful and applicable to a wide variety of applications including bias detection, explanation generation, etc. It also has the advantage that whenever the black-box predictor changes, transfer learning can easily update the rest of the model. Re-training in a full or incremental manner may be applicable, but generally transfer learning provides a fast and efficient way to learn very complex models.

It may be contemplated that an exemplary embodiment may not have the power to learn directly in an incremental manner. Learning an explainable RL system from scratch using the experience dataset may be too expensive to do it repeatedly. Once the white-box model is created, XNNs/INNs may be used to learn in an incremental manner. Having an explainable/interpretable model as a neural network enables the system to take advantage of backpropagation techniques such as gradient descent.

It may also be contemplated that once the INN model is trained via transfer learning, further training epochs may be applied to the INN model directly without the need to use the back-box model on its own again. After the initial transfer learning, the embedded predictor model may be configured to have trainable weights which enables the original predictor to fuse into a new model which is now part of the INN.

XRL systems based on XNNs/INNs may have the same Human Knowledge Injection advantages, just like any other XNN/INN. In other words, since INNs/XNNs may be encoded into rules and make use of an external process to initialize the structure of the INN partitions, it is possible to embed human knowledge within the neural network. Human knowledge may be embedded in an XNN/INN model through transfer learning/conversions which may be applicable depending on the compatibility of the human knowledge. The compatibility of the human knowledge may be determined according to a universal representation format. This may encapsulate any human knowledge that can be represented in a format compatible with the Universal Knowledge Representation which is supported by XNNs/INNs. An exemplary rule representation format may include a system of Disjunctive Normal Form (DNF) rules or other logical alternatives, like Conjunctive Normal Form (CNF) rules, Boolean logic, first order logic, second order logic, propositional logic, predicate logic, modal logic, probabilistic logic, many-valued logic, fuzzy logic, intuitionistic logic, non-monotonic logic, non-reflexive logic, quantum logic, paraconsistent logic or other suitable type of logical system for the expression of logical or similar statements.

Human knowledge injection (HKI) can improve XNNs/INNs by refining the rule-based knowledge bases in the XNNs/INN via gradient descent techniques. HKI can be also utilized within XRLs in a variety of ways: (i.) by initially boot-strapping the XRL agent directly with known action policies, predictions, loss functions, and so on; (ii.) by refining and/or defining explanations and explanatory models in the XRL agent; and (iii.) by injecting knowledge in the explainable model used in the XRL. In an exemplary embodiment, special configurations may be applied to lock specific neurons or layers, thereby preventing the network or system from updating those neurons or layers. The human knowledge can be fixed, while still allowing the machine-generated rules to be updated in a global manner. Thus, humans may assert control and embed rules, desired behavior, and potential safety features within the resulting machine-generated system, safe in the knowledge that these directives will not be changed over time by the AI system. When directives are incorporated into the AI system, a sub-set of the weights and functions representing these directives may be marked as static information when implemented in software or as static hardcoded circuit when implemented in hardware. Such a configuration still allows for the rest of the AI system to be trainable and refinable using standard machine learning methods such as gradient descent methods or back-propagation but guarantees that the original directives will be left unchanged over a potentially large number of training iterations and automatic modifications. This static and unchanging guarantee provides peace of mind to human designers who may want to ensure that a particular directive, especially one related to safety, desired behavior, ethical concern, or some other related desired property cannot be overridden or modified by the AI system during its normal operation or during training or related modes of operation. Of particular interest is a static hardware implementation which may be even more robust to change tampering.

Figure 9:
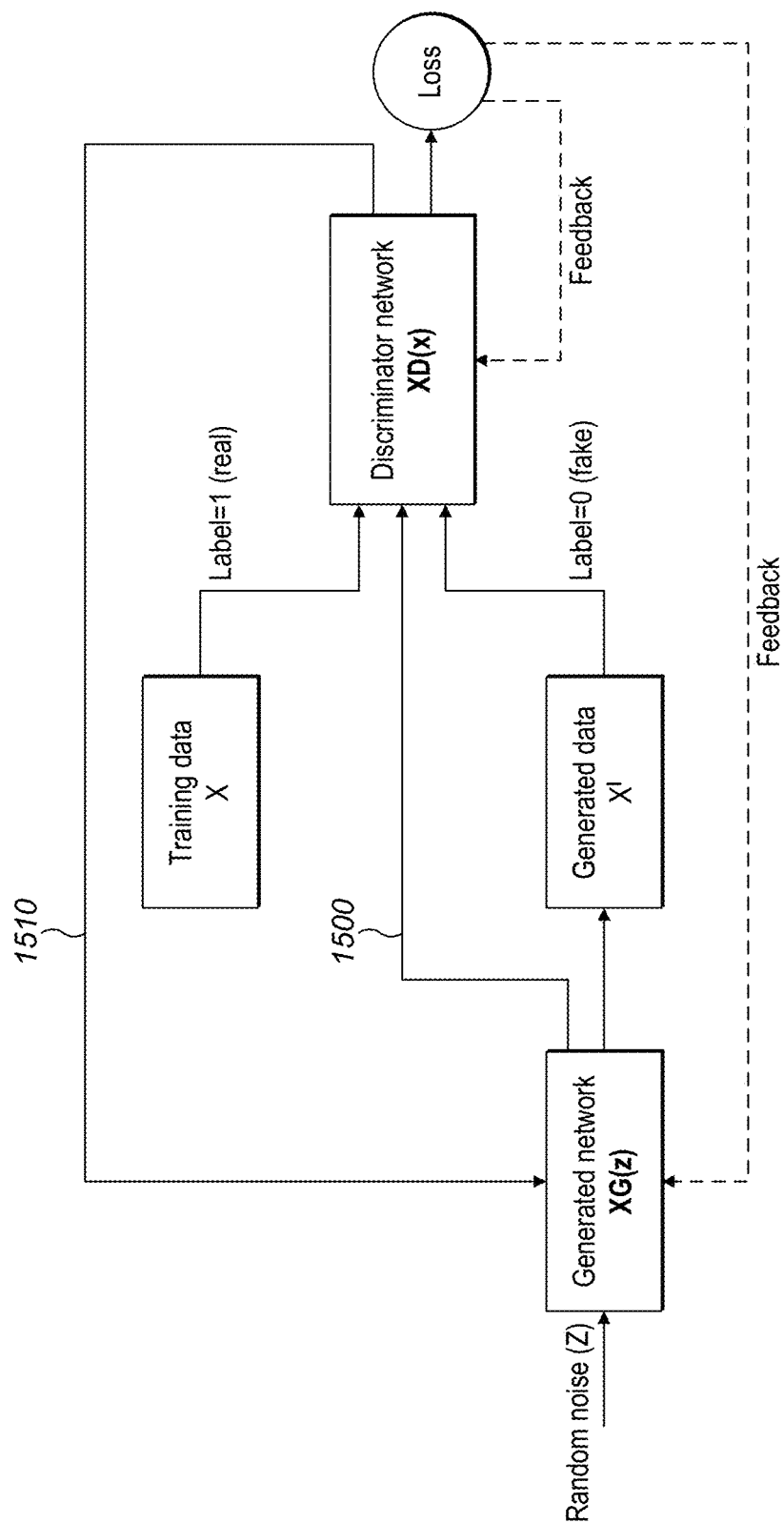
FIG. 9 illustrates an exemplary Architecture of a Fully Explainable GAN (XGAN).

In an exemplary embodiment, XRLs may utilize Explainable Generative Adversarial Networks (GAN), which can be referred to as XGANs. As shown in FIG. 9, an XGAN architecture may include an explainable generator XG(z) and an explainable discriminator XD(z). In an exemplary XGAN architecture, both the generator and the discriminator may be an explainable architecture x, where $x \in \{XAI, XNN, XTT, XRL, XGAN, XAED, XSN, XMN, INN\}$, or logically equivalent or similar architectures. The explainable generator architecture XG(z) may accept noise vectors z, which are sampled from a sample prior, and conditional vectors e in order to control the generated samples for a particular conditional constraint. The explainable discriminator architecture XD(x) may accept conditional vectors e, in order to constrain the XGAN architecture to a particular conditional statement, samples from the training dataset and samples generated from the black-box generator G(z). The XD(x) architecture generates explanations of the partitions and feature attributions of the input dimensions in the exemplary explainable architecture.

In an exemplary XGAN implementation, bias may be detected and explained on the input images that are generated from the generator G(z). The detected bias may provide explanations on how the explanation discriminator XD(x) was unable to distinguish the generated samples from the real training dataset.

The bias detection, feature attributions and partition related explanations may be utilized as a feedback input 1510 to the explainable generator XG(z) to tune and construct better samples. In an exemplary XGAN embodiment, the input of the explainable discriminator architecture may include explanations 1500 generated from the explainable generator architecture.

Figure 10:
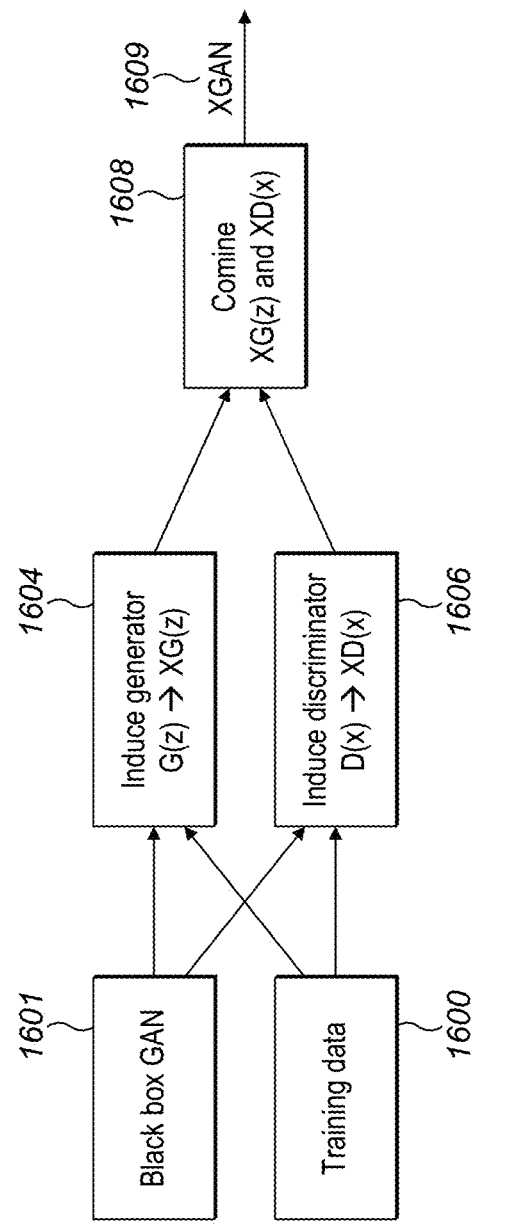
FIG. 10 illustrates an exemplary illustration of an XGAN Learning Process.

Referring now to FIG. 10, FIG. 10 may illustrate an exemplary XGAN learning process. The explainable generator XG(z) 1604 may be induced using training data 1600, a black-box generator G(z) or using a black-box discriminator D (z) which may be from a black-box GAN 1602. The explainable generator XG(z) 1604 may be induced by using the G(z) architecture and may minimize the residuals of G(z) and XG(z), during the training of XG(z). The explainable generator XG(z) 1604 may be induced using the black-box discriminator D (z) architecture by using the output of the discriminator D (z) to train the explainable generator XG(z). The explainable discriminator XD(z) 1606 may be induced using training data 1600 or the black-box discriminator D (z) (which may be from a black-box GAN 1602), by minimizing the loss of the output of D (z) and the output of XD(z). The resulting generator 1604 and discriminator 1606 may be combined using an appropriate combination step 1608 to create the XGAN 1609.

Ho and Ermon (2016) propose a non-explainable Generative Adversarial Imitation Learning (GAIL) model, consisting of a model-free imitation learning algorithm that trains a generative model G for the distribution of state-action pairs that an RL agent encounters when following a particular expert policy $\pi_E$, in order to train a policy $\pi$ directly from the data. The expert policy $\pi_E$ is derived directly from data samples defined by one or more experts. A generative adversarial network (GAN) is utilized to train the occupancy measure of a policy to be as close as possible to the occupancy measure of the policy of the expert. The occupancy measure of a particular policy is the distribution of state-action pairs that an RL agent encounters when navigating a particular environment with a particular policy. In a GAIL model, the objective of the generator G is to attempt to convince the discriminator D into classifying or otherwise identifying that the generated data was retrieved from the state-action pairs of the expert, in order to construct a policy that is indistinguishable from the policy of the expert.

The GAIL model serves as a template for non-explainable imitation-learning RL, however it does not address the use of explainability and how additional sources of information and knowledge, such as causal knowledge or neuro-symbolic information can be seamlessly incorporated. The Explainable Generative Adversarial Imitation Learning (XGAIL) model defined in this work makes a number of novel fundamental changes to the GAIL model that adds these capabilities. The XGAIL model also seamlessly integrates with XRL agents, allowing XRLs to utilize GAN-like techniques efficiently while also utilizing statistical, causal, and symbolic knowledge, something that is impossible to do with a basic GAIL model. An exemplary XGAIL implementation may train the occupancy measure of a policy using an XGAN, while GAIL would use a black-box GAN to train the occupancy measure of a policy. XGAIL differs from GAIL by generating explanations in addition to the construction of a white-box model. In typical exemplary implementations, XRL agents can incorporate an XGAIL model to add imitation learning capabilities to the XRL agent without losing the end-to-end explainable characteristic of XRL agents.

Figure 11:
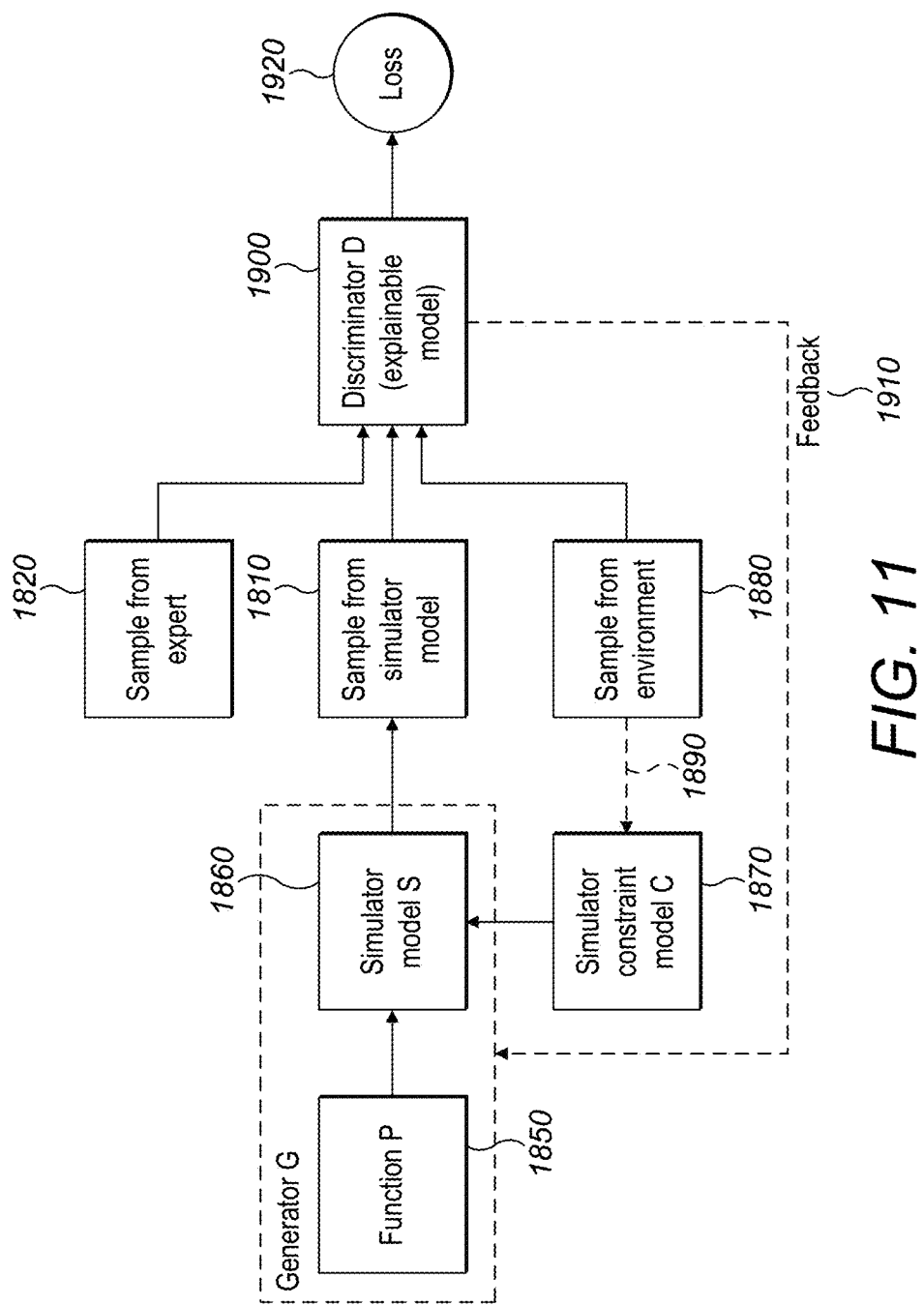
FIG. 11 illustrates an exemplary Explainable Generative Adversarial Imitation Learning (XGAIL) embodiment.

FIG. 11 illustrates a typical XGAIL embodiment. XGAIL replaces the GAN model with an XGAN that may generate multiple levels of explanations, which may include hierarchical partitioning information, internal coefficients of various models, and feature attributions of the input features which refer to the trajectories of the policy of the expert, and the explanations may be an output to the interpreter. Explanations may be in multiple formats, including but not limited to, a textual format for human readability, numeric formats which may represent the importance of the input dimensions or the bias in the given input dimensions, or any other suitable format. XGAIL also utilizes an explainable model for the Discriminator, while allowing the Generator to be either explainable or non-explainable. When XGAIL uses a non-explainable Generator, it will be classified as a grey-box XGAIL model. When XGAIL uses an explainable Generator, it will be classified as a white-box XGAIL model.

Continuing with the exemplary XGAIL embodiment in FIG. 11, the generated explanations from the explainable discriminator XD 1900 may be used to provide feedback 1910 to a generator 1800. The XGAIL generator G 1800 consists of a function P 1850 that drives the simulator model S 1860. P may be a differentiable function when S consists of neural network or gradient-descent based models. P may also be differentiable or non-differentiable when S consists of symbolic models. It is contemplated that S may be a black-box model, i.e., a normal GAN-style generator G, or an XGAN-style explainable generator XG. It is further contemplated that S may be a symbolic model that generates simulated or synthetic data via a set of rules, a formal language, neuro-symbolic model, logical model, or other form of symbolic model. It is further contemplated that S may be implemented using a hybrid model, such as that allowed via an ESM. S also receives constraint updates and priors from a simulator constraint model C 1870. C may represent a combination of statistical, causal, symbolic, and neuro-symbolic knowledge. For example, C may implement statistical information such as joint distribution of variables or variable interactions. In another example, C may implement causal information as a causal model that can support associations, interventions, and counterfactuals. In another example, C may implement symbolic information as a set of rules, a formal language, neuro-symbolic model, logical model, or other form of symbolic model. In another example, C may implement a combination of pre-defined knowledge priors, physical world models such as physics simulation models, experimentally derived knowledge, knowledge bases, knowledge graphs, taxonomies, ontologies, rules, Bayesian estimates, or other suitable knowledge sources. In the exemplary embodiment presented in FIG. 11, the explainable discriminator XD 1900 may take input from three main types of data sample sources: expert-derived samples 1820 (as happens in a GAIL model); or a sample from a simulator model 1810 which is generated from the Generator G 1800 (which fundamentally differs from the GAIL model in various ways due to the incorporation of causal and symbolic knowledge and the notion of explainability and constraints); or a sample from the RL/XRL agent environment 1880 (which is not contemplated in GAIL models). The environment derived sample 1880 may also be used in an environmental feedback loop 1890 to update the simulator constraint model C 1870 dynamically and adaptively as the RL/XRL agent encounters novelties in the environment. The explainable discriminator is also utilized in the determination of the loss value 1920. The loss value 1920 may also be used in a feedback loop back to discriminator D 1900 (not shown in FIG. 11).

An XRL agent has four main methods of improving on its initial configuration to gain adaptivity: (i.) via self-training against simulation; (ii.) self-training using interventional actions against simulation; (iii.) active learning against the live environment; (iv.) active learning using interventional actions against the live environment.

In an exemplary embodiment, an XRL agent with an XGAIL model may be utilized in a telecommunications network implementation to control and optimize mobile networks. Such an XRL agent may be bootstrapped via HKI by converting heuristics and symbolic rules that have been defined by domain expert as a starting point. The XRL agent has four main methods of improving upon such knowledge to gain adaptivity: (i.) via self-training against a simulation or digital twin of the mobile network (i.e. a simulated observational approach); (ii.) via self-training using interventional actions against a simulation or digital twin of the mobile network (i.e. a simulated interventional approach); (iii.) training and active learning against the live mobile network (i.e. an observational approach); (iv.) training and active learning via interventional actions on the live mobile networks (i.e. an interventional approach). Continuing with the example, interventional actions may consist as remote antenna configuration changes (like Remote Electrical Tilt operations), uplink and downlink transmission speed optimization, and other suitable actions. The XRL agent explanations during simulated observational and simulated interventional modes allow the XRL system users at the telecoms operator to gain confidence and trust in the correct operation of the system prior to allowing it to control the live mobile network. In a further exemplary embodiment, a similar XRL agent with an XGAIL model may be implemented in similar control, monitoring and optimization applications, for example, to optimize a utility power grid distribution operation, where the XRL agent performs interventional actions, such as turning power switches and transformers on and off, perform dynamic load balancing, and interface with power control systems using industrial control hardware and/or industrial control interfaces such as SCADA to execute the learnt actions. It is further contemplated that the XRL agent explanations may be tailored to a particular application via appropriate explanation output templates and Explanation Structure Models (ESMs) or other suitable configuration mechanisms. It is further contemplated that such an exemplary XRL application may be implemented in a distributed manner, for example allowing a utility provider or a telecoms provider to distribute command and control for monitoring and optimizing their respective network across multiple geographically dispersed regions, which may be useful when centralized systems are impractical due to distances or communication bandwidth constraints or reliability concerns if there are unreliable periods when the system has to work in offline mode or other typical use cases such as the optimization of power consumption vs bandwidth usage; latency minimization; maximization of resilience and robustness; and security assurance. It is further contemplated that an XRL agent may be suitably implemented with a combination of observational and simulated methods to enable a practical implementation of mimic learning.

In an exemplary industrial robotics manufacturing application of XRLs involving a robot arm, the predicted explanations for a set of movement commands can be used to determine whether such movement commands will lead to an unsafe situation for any human operators, living objects or inanimate equipment that may be in the proximity of the robotic arm. An exemplary XRL can thus open up a new set of capabilities in industrial and commercial and non-commercial applications that allow safety to be part of the control loop of automated machinery, apparatus, and systems. It is further contemplated that an XGAIL model incorporated within the XRL can help such exemplary robotic applications achieve a higher level of flexibility and adaptability while maintaining safety guarantees and boundaries.

In an exemplary embodiment, an XRL is utilized to anticipate the behavior and subsequent consequences of an autonomous vehicle or robot including but not limited to autonomous air, land, sea, underwater and space indoor and outdoor vehicles and tethered and untethered robots. Using XRL, an autonomous driverless car, for example, may determine that in one of its anticipated future explanations there is a reference to a child or adult being potentially hit by the driverless car. When the safety control system in the driverless car detects the anticipated references, it may take an appropriate safety related action, such as to switch the car to a safer driving mode, slow down, or turn on some higher resolution sensor to better resolve the future possibilities prior to them actually occurring. XRL may allow practical systems to safely operate automated machinery based on the anticipation and prediction of consequences. The ability to guarantee a safe mode of operation of machinery and robots, especially machinery and robots which interact with people, is a major unresolved problem which XRL may solve to a large extent. In a further exemplary embodiment, an XRL agent may be used as the main control system within an embodied AI system, such as a mobile robot or suitable device, such as in manufacturing, transport, or medicine, that interacts with the physical environment and possibly with humans.

An exemplary XRL embodiment may be incorporated within a behavioral model framework BM. A condition c may be set on the internal parts of an explainable architecture x within the XRL embodiment, on the prediction output of such white-box model, or on variables of other sub-components within the behavioral model framework BM.

A behavioral model BM may contain a set of actions a, where $BM_a \in \{a_1, \ldots, a_n\}$, that perform a change in the status of a sub-component within the framework or raise an event e within the framework. Actions $BM_a$ may be triggered by a trigger t. A behavioral model BM may contain a set number of triggers $BM_t \in \{t_1, \ldots, t_n\}$. A trigger t is activated when a condition c set for the trigger, $t_c$, is set to true. A trigger t may have multiple sets of conditions to be activated, such that $t_c \in \{c_1, \ldots, c_n\}$. A condition may be of the form of conjunctive normal form (CNF), or disjunctive normal form (DNF), or a suitable first order logic in order to be compatible with formal verification problem solvers such as Satisfiability module theories (SMT) and conflict-driven clause learning (CDCL) Satisfiability (SAT) solvers.

In an exemplary scenario, an autonomous system may be designed using a Behavioral Model BM. BM may include an XRL embodiment where it includes an exemplary explainable architecture x. An exemplary autonomous system may have conditional constraints $BM_c$ on the explainable architecture x. The activation of conditions $BM_c$ may fire events $BM_e$ to trigger $BM_t$. The triggers $BM_t$ may provide feedback actions $BM_{af}$ or terminal actions in the behavioral model $BM_{at}$. Autonomous system Behavioral Model BM may include multiple machine learning models $BM_x$, where $BM_x \in \{x_1, \ldots, x_n\}$. In an exemplary embodiment, conditions of Behavioral Model Hierarchy BM may be fused together as a conditional requirement for a particular trigger in $BM_t$.

Figure 7:
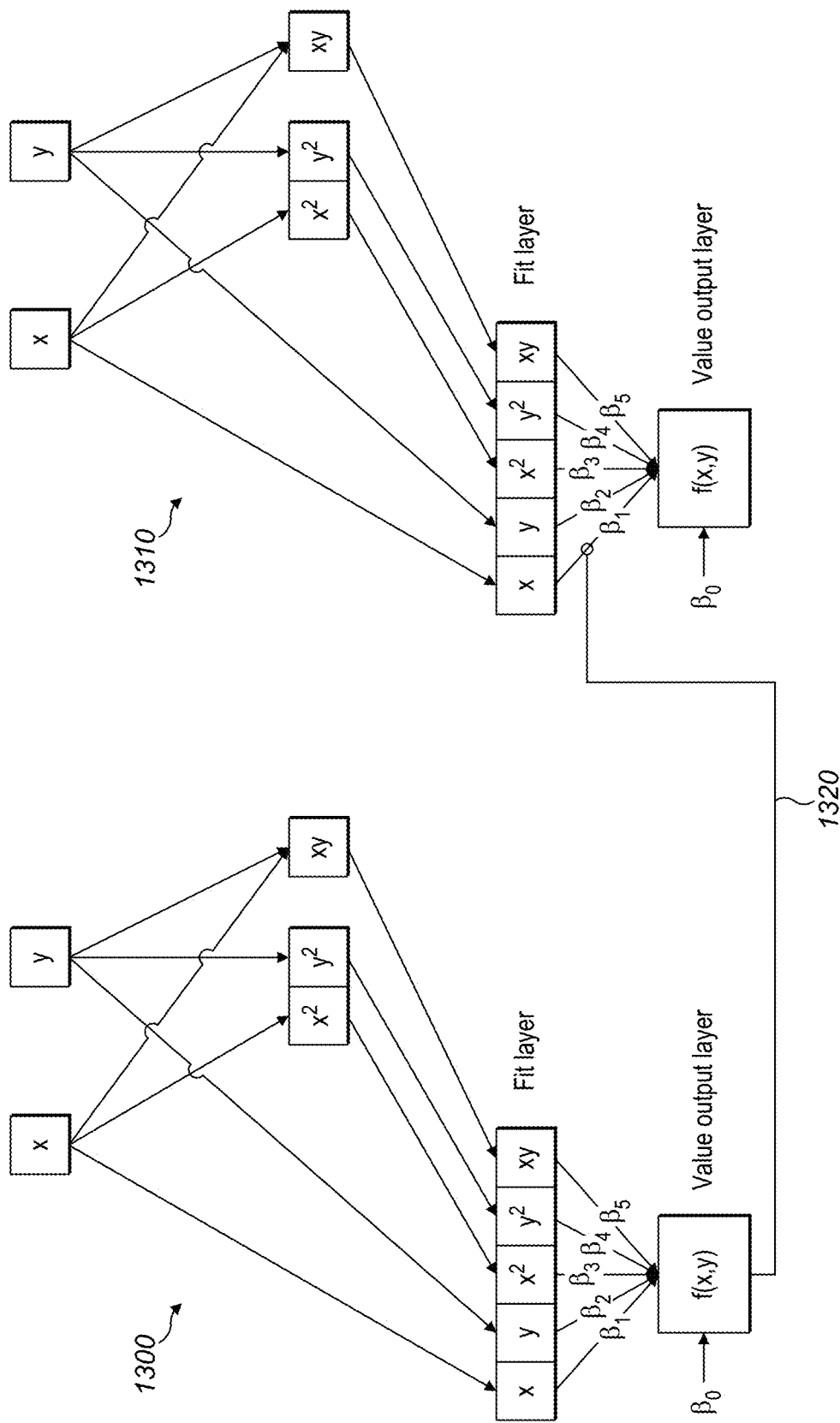
FIG. 7 illustrates an exemplary fast partial XNN architecture.

A BM may contain multiple explainable architectures $BM_x$, such that $BM_x \in \{x_1, \ldots, x_n\}$, and the output from a neuron node in an explainable architecture of the XRL embodiment may be used to update a weight in another explainable architecture within the behavioral model framework BM. The explainable architecture that may include weights that are updated using this approach may be known as a fast explainable architecture $f$, where $f \in \{F-XAI, F-XNN, F-INN, F-XTT, F-XRL\}$. A condition c in a BM may be based on a fusion constraint of weights and output of a node, of a fast explainable architecture, as shown in FIG. 7. A condition c in a BM may be based on a fusion of constraints that include a weight from an explainable architecture that uses Fast Weights and a prediction output or a coefficient from an internal part from a normal explainable architecture. As may be understood in the art, Fast Weights may provide a temporary repository of certain previous events through weight variables which may change more quickly than standard model weights, essentially providing a "short-term memory" for the system. A condition c in a BM may be based solely on a fast weight in a fast explainable architecture. In an exemplary embodiment, a BM may include an XNN explainable architecture $BM_{x,1}$ 1300 and a fast XNN explainable architecture $BM_{x,2}$ 1310. The $BM_{x,1}$ 1300 prediction output layer of the prediction network may be connected to a particular coefficient 1320 of the prediction network of a fast XNN architecture $BM_{x,2}$ 1310.

In an exemplary embodiment, an XRL system may utilize Fast Weights in its explainable model components. Such XRL systems may be denoted as Fast XRLs or F-XRLs. Fast Weights may give a superior boost to runtime performance of the resulting XRL system while enabling it to adapt quickly to changing input dataset distribution and new previously unforeseen training data samples that were not part of the original training dataset. F-XRLs may also be more efficient at handling sequence input data and other similar multi-dimensional input data.

In an exemplary embodiment, an XRL system may be incorporated within a workflow system that reads from the XRL system and writes back to the XRL, including both processing data and event data. It is further contemplated that such XRL and workflow combination may be further integrated within a Robotic Process Automation (RPA) system, Decision Support System (DSS) or a Data Lake system.

It is further contemplated that XRL actions, reward definitions, objective metrics, policy definitions, conditions, constraints, actions, triggers, and events may utilize a combination of abductive, inductive, deductive logic in conjunction with causal logic. Using inductive logic, XRLs may predict future behavior based on generalized rules and knowledge that may have been learnt fully automatically. Using deductive logic, XRLs may predict behavior according to a combination of one or more conditions or constraints. Using abductive logic, XRLs may retrofit an observed scenario to a known set of possible states in the XRL system or be able to explain the currently observed behavior in a reasonably acceptable manner. Abductive logic may also be useful in practical implementations of XRL-based diagnostic systems and can be used to aid in the diagnosis and troubleshooting of AI systems using behavioral monitoring and predictive data. Abductive logic may also be useful in the creation of XRL-based explanation narratives that fit an observed state, while inductive and deductive logic may be useful in the creation of XRL-based explanation narratives in general, together with predictive-like narratives. Abductive logic may be useful in situations where the environment provides partial observability.

In an exemplary embodiment, an XRL may link neuro-symbolic conditional constraint with its previous historic rate of activations in order to constrain the rate of trigger activation. A neuro-symbolic constraint may be implemented in a variety of suitable exemplary implementations including, but not limited to, in the form of symbolic rules or system of symbolic expressions, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L2 functions, fractal-based transforms, Hadamard transforms, Type 1 and Type 2 fuzzy logic and difference analysis. Neuro-symbolic conditional constraints may also be implemented in form of a data structure that references the different features and variables accessible to the explainable model and any associated taxonomies, ontologies, and causal models. Neuro-symbolic constraints may also be implemented in the form of knowledge graph networks.

In an exemplary embodiment, an XRL may be integrated with a combination of an Explainable Machine Learning System, Interpretable Machine Learning System, Explainer, Filter, Interpreter, Explanation Scaffolding, and Interpretation Scaffolding within the context of an Explanation and Interpretation Generation System (EIGS) and/or the Explanation-Filter-Interpretation (EFI) model.

In an exemplary embodiment, an XRL may be used to input, output and process Explanation Structure Models (ESMs) together with an optional Explanation Output Template (EOT) to create Machine and Human Readable Explanations for use in different applications, including EIGS-like applications.

Figure 13:
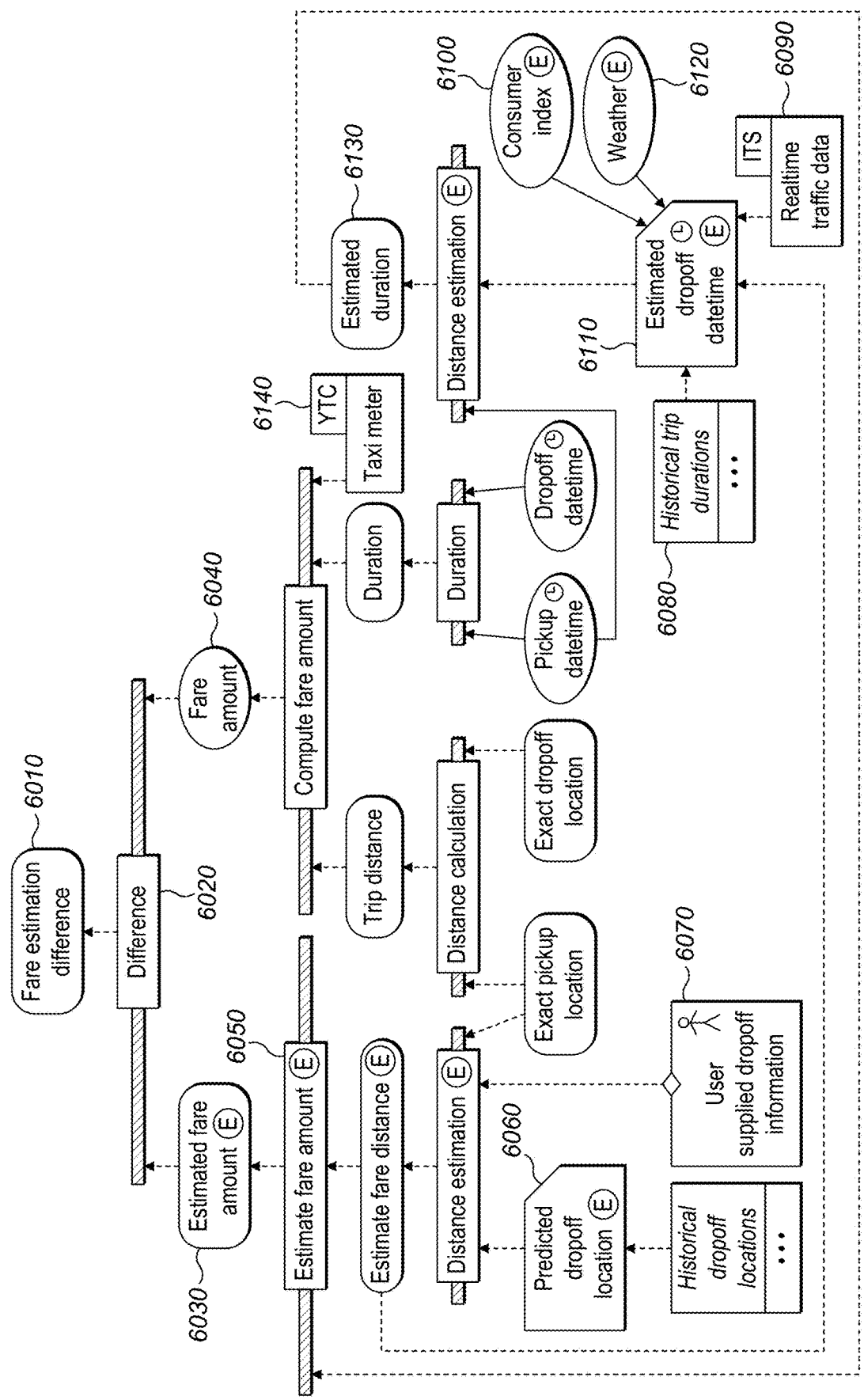
FIG. 13 illustrates an exemplary ESM of imitation learning/predictive coding.

FIG. 13 illustrates an exemplary ESM that may be used in an XRL embedded controller application for an autonomous vehicle that provides paid taxi services. The XRL agent is receiving information from the environment via real-time traffic data 6090 received from an Intelligent Transport System (ITS) and from its onboard taxi meter 6140 that is receiving internal sensor data combined with Global Navigational Satellite System (GNSS) data. The exact pick-up location and exact pick-up time are known as soon as the passenger gets onboard the autonomous vehicle. The XRL agent subsequently attempts to predict the drop-off location 6060 using historical drop-off location data and/or by direct optional input 6070 from the onboard passenger who may utilize a suitable interface to set the drop-off location. The drop-off time is estimated via a combination of historical trip duration data 6080, the estimated trip distance (that was calculated via 6060 and 6070), and two causal variables: a consumer index 6100, and the forecasted weather conditions 6120, which are estimated from external models as they do not form part of the main dataset. The weather conditions 6120 has a known and confirmed causal link to the estimated duration. The consumer index 6100 has a suspected and not-yet-confirmed causal link to the estimated duration, which is denoted by the question mark in the link 6110 between the consumer index and the estimated drop-off time. The estimated drop-off time is used in conjunction with the pick-up time to estimate the trip duration 6130. The drop-off location estimate, and the estimated duration are both used in a fare estimation process 6050 to estimate the trip distance and provide an estimate of the fare amount 6030, which may change dynamically throughout the trip as traffic conditions change. When the trip actually finishes, the fare amount 6040 is computed from the actual trip distance and duration (which are marked as anchor terms in the ESM). The difference between the estimated fare amount 6030 and the actual fare amount 6040 is calculated in a difference estimation process 6020, which then outputs the fare estimation difference 6010. The fare estimation difference 6010 is used as environmental learning input to the XRL agent, and may be used in a predictive coding manner to improve the estimation accuracy for subsequent trips. It is also contemplated that the estimated fare amount 6030 and the estimated duration 6130 are communicated by the onboard XRL agent to another explainable AI system that controls the dispatch and optimization of the autonomous vehicle fleet. The onboard XRL agent may make its own independent decisions regarding the precise turn, acceleration, braking and other driving decisions that affect the trip. The onboard XRL agent may also receive instructions from the fleet dispatch and control AI system that modifies the trip depending on fleet-level policies. The XRL agent may thus make independent decisions and optimizations based on local environment conditions in combination with centralized decisions and optimizations based on a regional (set of local environments) or global environment. It is further contemplated that XRL agent may thus make independent decisions and optimizations based on local explanations in combination with centralized decisions and optimizations based on a regional (set of local explanations) or global explanation. The explanations of the XRL agent may be displayed to the onboard passenger in a suitable manner using an Explanation Output Template (EOT) that is linked to the onboard XRL agent's ESM, such as the one exemplified in FIG. 13. An example of an EOT that displays basic trip information may be of the form of an application screen output:

```
"ETA: <now( ) + estimated duration: format[HH:mm] > Estimated Fare: <estimated fare amount: format[Currency]>"
```

Conditional output rules may also be embedded within the EOT:

```
"IF difference(<estimated duration>, <historical trip duration>) < 15% THEN
<traffic_conditions>='normal'
IF difference(<estimated duration>, <historical trip duration>) in (15%, 50%) THEN
<traffic_conditions>='moderate'
IF difference(<estimated duration>, <historical trip duration>) > 50% THEN
<traffic_conditions>='heavy'"
```

Conditional output with further interactive decision rules may also be embedded within the EOT, which may be linked to a workflow system or other suitable system to implement interactivity in the case of human involvement, or an automated decision support system for fully automated decisions:

```
"IF <traffic_conditions>='heavy' AND
     difference(<alternative_route[0].estimated_fare_amount>, <estimated_fare_amount>) > 10%
THEN
     trigger(<ask_user_confirmation_workflow,
        "Autotaxi found an alternative faster route that is" +
        get_readable_label(quantity_magnitude_description,
        difference(<alternative_route[0].estimated_fare_amount>, <estimated_fare_amount>)) +
        "more expensive by",
        difference(<alternative_route[0].estimated_fare_amount>, <estimated_fare_amount>)"
```

Continuing with the autonomous vehicle taxi service exemplary embodiment, the XRL agent explanations may also be used to provide auditable evidence in case of accidents, and also provide evidence that protects the fleet operator from accusations of algorithmic bias while providing consumers evidence of fairness and additional insight into the operation of the autonomous vehicle taxi service, increasing their levels of trust in such a service. It is further contemplated that this exemplary embodiment can be applied to other industries with appropriate changes, especially to situations, like on-demand services that are driven by AI systems.

Figure 14:
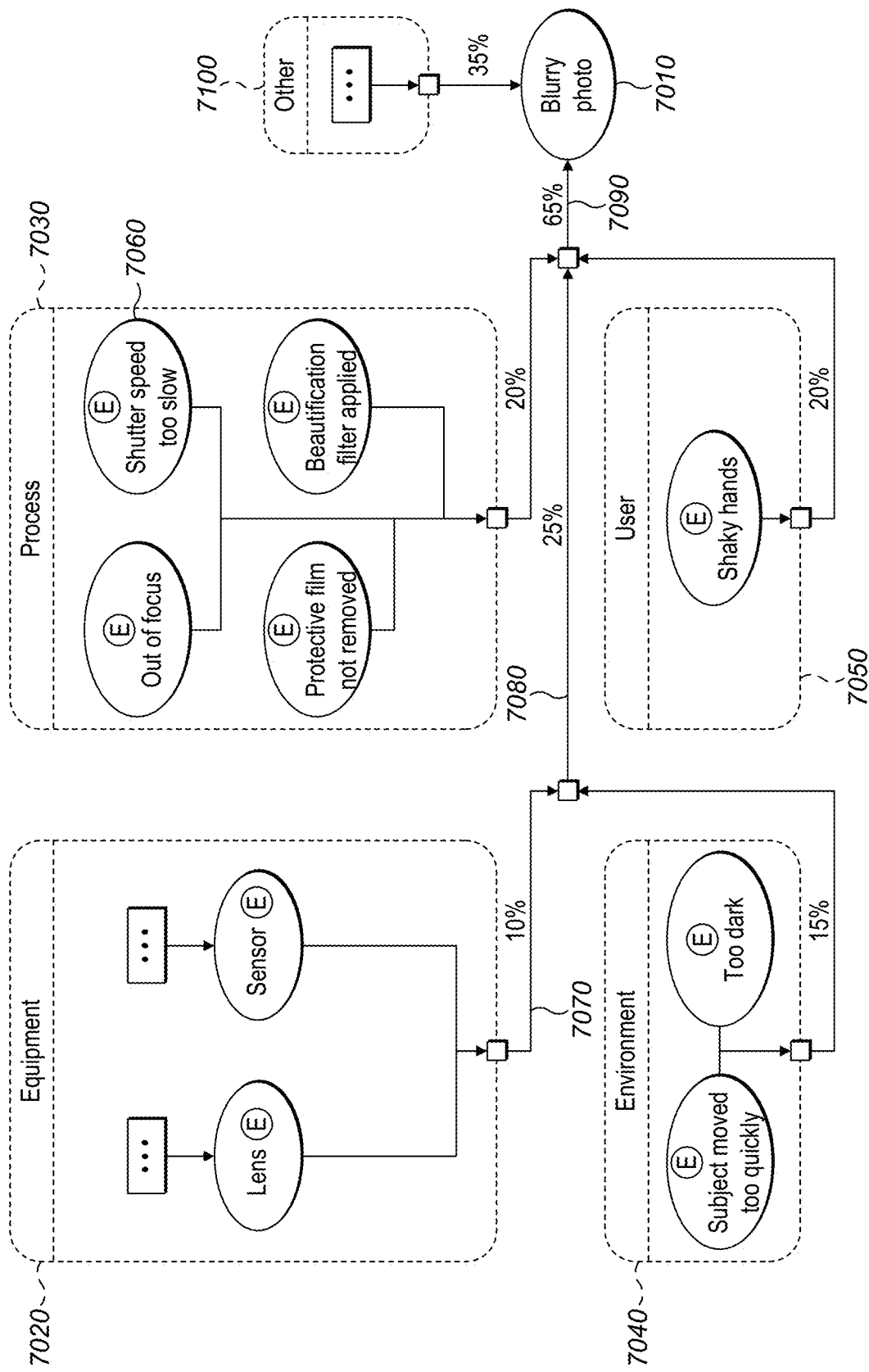
FIG. 14 illustrates an exemplary ESM showing a Root-Cause-Analysis.

In an exemplary embodiment, an XRL agent may be used to output an explanatory Root-Cause-Analysis (RCA), for example within an optical image processing hardware device or advanced camera system. FIG. 14 illustrates an exemplary RCA ESM diagram (also known as an Ishikawa or fishbone diagram) that explains the factors behind blurry photos that have been captured by the system. The XRL agent determines that there are four primary factor groups behind the observed effect outcome 7010, blurry photos, namely: equipment issues 7020, process issues 7030, environmental issues 7040, and user issues 7050. Each primary factor group may have secondary factors (and tertiary factors, and so on in further levels of detail) such as "shutter speed too slow" 7060 that have been estimated by the XRL agent directly or using a separate sub-process or module. Other primary factors that are not important enough to be shown in a summarized executive level view are summarized under an "Other" factor group 7100, which de-clutters the RCA ESM display. The causal attribution scores, computed from the RCA analysis, are aggregated for each factor group, and displayed along a factor attribution link that increasingly aggregates all the casual attribution scores until all the known causal factors. For example, Equipment 7020 attributes 10% to observed causes of the outcome, as depicted in link 7070, while Environment 7040 attributes 15% to observed causes of the outcome, as depicted in link 7050. The two scores are aggregated together in link 7080, which shows the combined causal attribution score of 25% as depicted in link 7080. Further aggregations occur all the way up to the final effect or outcome 7010, with link 7090 depicting all the aggregated attribution scores, for example, totaling to 65% which is then finally added to the score from the "Other" factor group to make up 100%.

An XRL agent may utilize generated structured explanations based on what-if, what-if-not, counterfactual, but-for, and conditional scenarios to generate explained strategies and scenario-based explanations that correspond to the outcome of applying such scenarios to the XRL agent input, where one or more hypothetical target outcomes are selected as part of the scenario modelling. Such scenario-based explanations are also known as contrastive explanations or comparative explanations, depending on whether the target scenario outcome is contrastive or comparative in nature, respectively. It is contemplated that in such a scenario-based explanation generation application, an XRL agent may associate the policy with the scenario being examined, the cost with the feature difficulty/attainability/severity, and the actions with domain specific and scenario-specific actions. In an exemplary embodiment, an XAI model such as XNNs may be used to predict the outcome of a loan application. A loan application may be accepted or rejected for various reasons, such as the total income, the current occupation, age, total net worth, and other factors. The system user may want suggestions on how to change the outcome of the loan application. For example, in the case of a rejected loan application, the system user may want to know what combination of items in the input needs to change for the status of an application to change from rejected to approved. It may be contemplated that only a sub-set of all input variables, features and feature interactions may need to be changed. One or more costs may be associated with each variable, corresponding to some suitable metric for each type of cost. For example, bias protected classes, such as gender or race, may have a very high cost associated or marked as impossible to reach outright (i.e., an illegal outcome state). In another example, a high cost may be associated with strategy actions that are irreversible. Other variables such as current income may have lower cost, than the total net worth variable. The cost of an action may be linear or non-linear and may contain dependent or independent variables which impact the total cost. Missing data may also have a special cost associated with it, enabling the XRL agent to handle missing data appropriately, with or without corrective measures. Explanation data such as feature importance or coefficients provide an exact measurement of the expected reward or cost for a given action. Exogenous and endogenous variables and causal models may be used to estimate the total cost of an action, including any specific association, intervention or counterfactual rules that need to be applied. An XRL agent may be trained to learn the suggested actions for a given user with a specific context, i.e., suggest possible changes in variables, which lead to a change in outcome while minimizing the total cost of actions. It may also be contemplated the suggested actions may contain some form of sequence, which lead to the desired goal. It is further contemplated that a nearest-neighbor method is utilized in conjunction with such scenario-based XRL explanations to provide (suitably anonymized) actual examples of applications that have had the desired scenario outcome (exemplars) or a hypothetical average of such an application (prototype). Such nearest-neighbor methods may take advantage of partition hierarchy structures within the explainable model, to generate examples from the same partition, or from a nearby partition or from a partition that is further away from the current partition. It is further contemplated that possible changes in variables are ranked and prioritized by some suitable system and presented to the user or to an automated process in the form of an Identify-Assess-Recommend-Resolve (IAR) framework. It may be further contemplated that alternative optimization methods may also be used to generate such scenario-based explanations such as Multiple Objective Optimization (MOO), Pareto Front Methods, Particle Swarm Optimization (PSO), Genetic Algorithms (GA), Bayesian Optimization, Evolutionary Strategies, Gradient Descent techniques and Monte Carlo Simulation (MCS). It is further contemplated that the reward values for the XRL agent are fully or partially linked to attribution values and other data stored in an Explanation Structure Model (ESM).

In an exemplary embodiment, an XRL may be used to do constant monitoring of AI models to detect anomalous behavior, detect instances of data drift and OOD instances, detect abnormal deviations from nominal operational cycles, analyze and assess the behavior of AI models under Out-of-Distribution (OOD) and anomalous instances, variation, deviation, performance and resource usage monitoring, phase-space, and other related monitoring activities.

A named reference label may be assigned to components within an XRL, in an explainable model. Named reference labels may be descriptive in nature and may also contain additional meta-data and links to external taxonomies, ontologies, and models. A named reference label may consist of symbolic expressions and/or formulas of the form of conjunctive normal form (CNF), or disjunctive normal form (DNF), or a suitable first order logic, to provide an explanation of the set or sequence of decisions that resulted in the execution of the current component, which we refer to as the path trace. An "activation path" may be defined as a data flow path followed by an AI model, starting from a particular input, and ending in a particular output prediction. The path trace is set or sequence of decisions, nodes, transitions, or applicable description structures for the particular AI model describing the activation path. Named references may be used in safety related constraints to ensure easier and more reliable identification by humans, especially in potentially critical and stressful situations where human attention span may be severely taxed or limited.

For example, named reference labels may contain meta-data about multimedia files associated with that named reference label, units and dimensions associated with the explainable model component. The named reference label itself is a direct form of symbolic reference, that can either be the named reference label text itself or an associated meta-data. In an XRL agent, a named reference label may also be automatically generated from relevant transition tables or similar information within the XRL agent or its constituent components.

In an exemplary embodiment, the named reference labels themselves may also be used by a suitable model discovery system or model optimization system, such as an exemplary AutoXAI system (that in this case, may discover and optimize an XRL architecture), to generate human-friendly explanations of an XRL related or other dynamical processes that may be otherwise very difficult to explain. It may be further contemplated, the named reference labels may remain invariant throughout such dynamical processes, even though the precise location, connection and relationship between the part and the whole of the relevant named component may change. Such invariance under dynamical processes makes named reference labels an ideal component for use within explanations. It is further contemplated that such an exemplary AutoXAI system may utilize a formal language or some other suitable means to represent a computational graph for the state knowledge stored within the XRL agent, together with more dynamic changes like the XRL loss function itself or alter the definition of $Q_x$ in Q-learning type of XRL agents. This allows the AutoXAI system to adapt the XRL agent performance to one or more specific application domains or tasks and provides a practical solution to the incorporation of meta-learning systems within XRL. The concept of a meta-learning curiosity system in non-explainable RL agents in (Ferran et al., 2020) can thus be incorporated within XRL, capitalizing on the fact that the explainable model used within an XRL agent may also be represented by a formal language or computational graph, unlike non-explainable RL agents that utilize black-boxes. Such meta-learning curiosity systems may also provide a practical solution towards the initial incorporation of human process knowledge which is subsequently refined during AutoXAI model discovery.

In another exemplary embodiment, the same invariance of named reference labels under dynamical processes may be utilized by an XRL to generate stable, long-term explanations of the dynamics occurring within an AI model without having to recode knowledge or retrain explanatory methods with each run of the dynamical process.

A number of nodes and edges, and other events, triggers, constraints, and actions in an XRL may be deemed to be important or critical for the particular application domain. Such importance may be determined either by the application or usage context, or via an external third party, such as a regulatory or legal authority or an industry standard making body, that imposes certain mandatory constraints. These type of important or critical constraints may be referred to as anchor terms, anchor variables, anchor nodes, anchor edges, anchor events, anchor triggers, anchor constraints and anchor actions, respectively. Such anchor components are analogous to the anchor terms within Explanation Structure Models (ESMs). Anchor terms may also be assigned a named reference label.

In another exemplary application used for illustrative purposes, a typical XRL agent such as the one illustrated in FIG. 3 may utilize control engineering models, such as Nyquist analysis, Bode plots, and other forms of analyses to process a wide variety of processing signals. For example, the feedback loop between 4500 and 4050 may be analyzed for stability, and the appropriate error and correction factors form part of the eventual action selection by the agent 4100. Some control engineering models may be inherently white-box and thus may allow for the generation of an explanation that is compatible with an exemplary XRL model, allowing for a seamless incorporation of such models within a large superset of explanation-capable systems. Within the framework of the explanation generation pipeline illustrated in FIG. 8, the output from exemplary control engineering models and systems may be incorporated in a combination of outputs 906, 910 and 914. In an exemplary embodiment of an XRL agent utilizing a control engineering model, such as applications involving real-time motor control (like in moving vehicles, aviation, energy applications, etc.) or some similar form of process control (like in manufacturing, chemical applications, etc.), the resulting explainable policy may include the control engineering model output directly, if the model is incorporated in the agent internal state 4200 or a similar component, or indirectly, if the model is incorporated in input 4050 or in a combination of components 4400, 4500, 4050 and the possible transitions between them.

In another exemplary embodiment, an exemplary XRL system can be embodied using a quantum computing system, where the optimal policies are discovered via the collapse of the quantum system according to a probability amplitude, possibly in a shorter time than possible with a classical computing system.

When XQRL systems are implemented using quantum computing devices, the XQRL agent's strategy may be given by the collapse of the corresponding quantum system according to the probability amplitude. XQRL algorithms might not guarantee the optimality of every strategy but may give the optimal decision-making with probability approximating to 1 by repeating the computation several times. Suppose that the XQRL agent gives an optimal strategy with a probability $1-\varepsilon$ after the agent has stabilized its learning, i.e. its state value function converges to V*(s). For $\varepsilon \in (0, 1)$, the error probability is $\varepsilon^d$ by repeating the computation d times. Hence, the XQRL agent will give the optimal strategy with a probability of $1-\varepsilon^d$ by repeating the quantum computation d times. The XQRL algorithms on real quantum computing apparatuses are effective due to the powerful computing capability of quantum system, which allows for simultaneous search capabilities inherent in quantum computing that may be difficult or impossible to achieve on classical computing architectures.

The XQRL agent described in an exemplary embodiment may be implemented, for example, using the probabilistic techniques presented in Dong et al. (2008), using the Grover iteration method, or any other contemplated and suitable method that can be implemented on a quantum computing system. It may be further contemplated that variations of the implementation method may be used to implement the XQRL agents, as the basic quantum formulation presented in an exemplary embodiment remain the same.

In an exemplary embodiment, an XQRL agent may be defined to be in a superposition of Q states. The classical computing version of the Explainable Bellman equation can be extended by having the quantum eigenstates of an XQRL agent use corresponding orthogonal bases for s, $x_s$, a, $x_a$. An arbitrary number of explainable states or explainable actions in an XQRL agent can be expanded in terms of an orthogonal set of eigen states $|s_n\rangle$, $|x_{s_n}\rangle$ or eigen actions $|a\rangle$, $|x_{a_n}\rangle$ giving rise to the following four exemplary definitions of the quantum states of the XQRL agent:

$$|S\rangle = \sum_n \alpha_n |s_n\rangle$$

$$|S_x\rangle = \sum_n \alpha_{xn} |x_{sn}\rangle$$

$$|A\rangle = \sum_n \beta_n |a_n\rangle$$

$$|A_x\rangle = \sum_n \beta_{xn} |x_{an}\rangle$$

Where $\alpha_n$, $\alpha_{xn}$, $\beta_n$, $\beta_{xn}$ are probability amplitudes that satisfy:

$$\sum_n |\alpha_n|^2 = 1$$

$$\sum_n |\alpha_{xn}|^2 = 1$$

$$\sum_n |\beta_n|^2 = 1$$

$$\sum_n |\beta_{xn}|^2 = 1$$

The tensor product of the XQRL states and the explainable state space may give the eigen explainable state set XS and may be defined by $|XS\rangle = |S\rangle \otimes |S_x\rangle$ where $\otimes$ is the tensor product. Similarly, the eigen explainable action set XA may be defined by $|XA\rangle = |A\rangle \otimes |A_x\rangle$.

If the number of states, explainable states, actions and explainable actions in an XQRL agent are denoted by NS, NSx, NA and NAx respectively, then two integer numbers p and q may be identified such that $(N_S N_{Sx}) \leq 2^p \leq 2(N_S N_{Sx})$ and $(N_A N_{Ax}) \leq 2^q \leq 2(N_A N_{Ax})$. In an exemplary embodiment of an XQRL agent on a quantum computing system, p and q qubits may represent the eigen explainable set XS and the eigen explainable action set XA, respectively. The following relations express the way that an exemplary XQRL system may lie in a superposition state of eigen explainable states, or eigen explainable actions respectively:

$$|XS^{(N_S N_{XS})}\rangle = \sum_{i=1}^{N_S N_{XS}} C_i |XS_i\rangle \longleftrightarrow |XS^p\rangle = \sum_{XS=00\ldots 0}^{p\{11\ldots 1\}} C_{XS}|XS\rangle$$

$$|XA^{(N_A N_{XA})}\rangle = \sum_{i=1}^{N_A N_{XA}} C_i |XA_i\rangle \longleftrightarrow |XA^q\rangle = \sum_{XA=00\ldots 0}^{q\{11\ldots 1\}} C_{XA}|XA\rangle$$

The action selection may depend on the QXRL agent learning an explainable policy $\pi_X$: $XS \times U_{i \in XS} XA_{(i)} \rightarrow [0,1]$ which may maximize the expected sum of the discounted reward of each state. The mapping from states, explainable state to actions, explainable actions is $\pi_X$: $XS \rightarrow XA$ giving:

$$f(XS) = |XA^q\rangle = \sum_{XA=00\ldots 0}^{q\{11\ldots 1\}} C_{XA}|XA\rangle$$

Where the probability amplitude CXA satisfies:

$$\sum_{XA=00\ldots 0}^{q\{11\ldots 1\}} |C_{XA}|^2 = 1$$

The explainable action may be thus obtained via the measurement of $|XA\rangle = \sum_n \beta_n \beta_{xn} |\alpha_n \alpha_{xn}\rangle$ into one of its eigen explainable actions $|a_n x_{an}\rangle$ with the corresponding probability $|\langle a_n x_{an}|XA\rangle|^2$ which can be further decomposed as follows:

$$|\langle a_n x_{an}|XA\rangle|^2 =$$

$$|(|a_n x_{an}\rangle) * |XA\rangle|^2 = \left|(|a_n x_{an}\rangle) * \sum_n \beta_n \beta_{xn}|\alpha_n \alpha_{xn}\rangle\right|^2 = |\beta_n \beta_{xn}|^2$$

The Grover iteration method used in Dong et al. (2008) or any other contemplated suitable implementation equivalent can be used to implement a practical embodiment of an exemplary XQRL agent system, where every possible state of the XQRL explainable state space $|XS\rangle$ can be expanded into an orthogonal complete set of eigen states $|s_n \otimes x_{sn}\rangle$: $|XS\rangle = \sum_n \alpha_n \alpha_{xn} |s_n \otimes x_{sn}\rangle$.

Using a unitary operator transformation U on the qubits allows for a practical implementation on a quantum computer system to simultaneously process the 2p stats with the TD(0) value updating rule for XRL:

$$V(s,x_s) \leftarrow V(s) + V(x_s) + \eta(r + \gamma V(s',x_s') - V(s,x_s)) + \eta_x(r + \gamma V(s',x_s') - V(s,x_s))$$

where $\eta$ and $\eta_x$ are the learning rates for the states and explainable states respectively, and the meaning of reward r and the discount factor $\gamma$ is the same as in the Explainable Bellman Equation for XRL (and also the same as in the standard Reinforcement Learning usage of the Bellman Equation).

Solving the above gives an exponential scale computation space in the p-qubit linear physical space and can speed up XQRL solutions significantly. A similar algorithm to that described in Dong et al. (2008) or logical equivalent updated with the XQRL solutions, and the qubit configurations described in an exemplary embodiment may give a practical XQRL implementation solution.

A QXRL agent may differ from an RL agent in the sense that a QXRL agent action may act purely on the explanation space xs without affecting the agent environment. A chain of purely explanatory actions is thus possible with a QXRL agent as is possible with an XRL agent, something that is not possible with a non-explainable RL agent. This unique QXRL feature is useful in all situations where the explanation, interpretation, justification, model fitting, scenario reasoning, planning, or other similar characteristic or criterion is necessary to achieve an optimal or sub-optimal solution to the problem or goal currently being solved by the agent. The QXRL agent offers the further possibility of operational and learning speedups that cannot be achieved via classical computing systems.

In an exemplary embodiment, an XRL may be used as the basis or part of a practical data privacy preserving AI system implementation. Data privacy may be violated intentionally or unintentionally by AI systems in a number of scenarios: (i.) personal data from training datasets unintentionally incorporated in AI models; (ii.) personal data can be re-extracted or re-created by analyzing the model answers repeatedly; (iii.) personal data of certain uniquely identifiable groups may end up at a higher risk of identification; (iv.) model inversion and membership inference techniques, that can associate model data via a unique key or signature; (v.) other sources of information, such as public data sources, which may be combined with private information, may re-create or otherwise identify private information. The main data privacy preserving solutions for AI can be classified under four categories: (i.) differential privacy; (ii.) secure multi-party computation; (iii.) federated learning; (iv.) homomorphic encryption. Exemplary embodiments of an XRL may enable practical implementations under all four categories.

In an exemplary privacy preserving solution (i.), differential privacy, the introduction of noise in the training data or some other suitable means of obfuscation, may be used to generate a controllable amount of privacy through a noise factor or ratio, in an XRL. The noise level may be a variable which the user may be able to supply or edit, where the noise level may be implemented as a constraint and/or objective. In privacy preserving solution (ii.), secure multi-party computation (SMPC) may be used to obtain a correct answer while concealing partial information about data and may simultaneously compute the answer using data from one or more sources. Exemplary embodiments of an XRL and explainable models may extend SMPC protocols to apply to explanation generation apart from answer output. It is further contemplated that exemplary embodiments of an XRL can be analyzed and tested formally for security and trust building purposes without revealing any private information. A secure enclave may also be used to decrypt the data in a protected space within the hardware processor, limiting the possibility that other parts of the system can access such data in clear text. An end-to-end hardware implementation of an XRL with a secure enclave may be rather resilient to most forms of data attacks. In privacy preserving solution (iii.), federated learning, an XRL may be distributed across various decentralized devices that hold only local data samples. The local data samples are not shared with other devices, thus limiting, but not completely eliminating, the privacy risk involved, and may be particularly suitable for IoT or edge computing applications where messaging options are limited or constrained by the network topology, such as in a mesh network. In privacy preserving solution (iv.), homomorphic encryption, or homomorphic computing may be used to allow computation on encrypted data without either decrypting the data and also, optionally, using encrypted explainable models. In an exemplary embodiment of an XRL using homomorphically encrypted data and a homomorphically encrypted XNN, utilizing the CKKS protocol, a secret key and a public key are generated. The public key is used for encryption and can be shared, while the private key is used for decryption and must be kept secret, for example, in a secure hardware enclave or similar implementation solution.

In an exemplary embodiment, an XRL may have multiple criteria measures based on model performance, bias reduction, and risk management. The combination of multiple criteria measures may be normalized by expressing the total paths from the root as 1 and the rest of the paths as a fraction of the total score bounded between [0 . . . 1]. It is contemplated that a node discovery process in an XRL may use game theory to discover the optimal nodes for the selected combination of criteria measures. It is further contemplated that alternative methods such as Multiple Objective Optimization (MOO), Pareto Front Methods, Particle Swarm Optimization (PSO), Genetic Algorithms (GA), Bayesian Optimization, Evolutionary Strategies, Gradient Descent techniques and Monte Carlo Simulation (MCS) may be used to discover optimal nodes for a given desired combination of criteria measures. It is further contemplated that such multiple criteria may be utilized within an exemplary embodiment of an AutoXAI system.

In another exemplary embodiment, an XRL may be incorporated within a suitable risk identification, assessment, and mitigation framework, such as that proposed by the ISO27001 model. It is also contemplated that an XRL may be incorporated within an Identify-Assess-Recommend-Resolve (IAR) framework that utilizes different metrics to identify issues, then related metrics to assess the severity of the identified issue, followed by ranked and/or scored recommendations and finally coupled with a decision to execute such recommendation as part of a resolution plan. In an exemplary embodiment, the XRL agent may implement bias identification, assessment, and mitigation systems together with the IAR framework.

In a further exemplary embodiment, an XRL agent may further incorporate a Goal-Plan-Action (GPA) system with the IAR framework. Such exemplary XRL agents may represent goals in a hierarchical manner, for example, by having objectives, goals, and sub-goals which are then solved via the planning of individual tasks that are executed by the XRL agent actions. Furthering the example, such a hierarchical goal structure can be used to augment the XRL agent reward system (by adding the concept of objectives, goals, and sub-goals to the reward function), allowing the planner to influence the XRL agent actions according to the dynamically determined optimal plan or set of plans. It is contemplated that a state pruning process may be applied to compress and reduce the number of possible states in the resulting goal-augmented XRL agent. It is further contemplated that the planner may dynamically re-plan the plan as the XRL agent progresses along in its environmental interactions, using a suitable prediction-error or predictive coding-based monitoring and control system.

In an exemplary embodiment, an XRL may implement audit log functionality. An exemplary application of such XRL audit log information is in the creation of decision logs and path traces that clearly illustrate the flow, interactions, and behavior of the XRL and its conditions, events, triggers and actions and overall dynamics. It is contemplated that path traces may be implemented in expert systems and rule-based systems as an annotated sequence of rules that have been triggered and executed. It is further contemplated that path traces may be implemented in workflow systems as an annotated sequence of workflow nodes and paths that have been executed by the workflow engine. The path trace can be used to illustrate the precise sequence and behavior of the XRL and may be implemented and configured to display nearest neighbors along the path that may be of interest to the user.

It is further contemplated that an XRL may utilize its own audit system log that can be stored in a system of record, DLT, database, or some other suitable system in a tamper-proof and traceable manner. Such audit information may be either stored in an independent system that is separate from the associated AI model or share the same audit system used by its associated AI model.

In an exemplary embodiment, an XRL may be implemented and verified by on a combination of systems based on one or more of the Temporal Logic of Actions, Abstract Machine Notation, Petri Nets, Computation Tree Logic, and other suitable implementation methods that can formally represent modal logics, intuitionistic logics, and/or relational semantics, including but not limited to Kripke semantics and/or Alexandrov topologies.

In an exemplary embodiment, an XRL will use a suitable computational and knowledge representation structure as the basis of its constraint and predictive logic implementation. Such a suitable structure may be a Resource Description Framework (RDF) tree, RDF graph, or other suitable form of graph structure. It is further contemplated that a hypergraph structure or a simplicial complex may be used in a practical XRL implementation.

In another exemplary embodiment, an XRL may be used in conjunction with AI models that process sequence data. Sequence data may include a number of data points which contain feature data in various sequential formats including, but not limited to a combination of one or more of: 2D data, 3D data, multi-dimensional data arrays, transactional data, time series, digitized samples, sensor data, image data, hyper-spectral data, natural language text, video data, audio data, haptic data, LIDAR data, RADAR data, SONAR data, navigational data, and the like. Data points may have one or more associated labels which may indicate the output value or classification for a specific data point or a continuous or non-continuous interval of data points. Data point sequences may result from an internal and/or external process that may output a combination of synthetic data points, perturbed data, sampled data, or transformed data. Such data point sequences may be the input for an XRL architecture.

In an exemplary embodiment, an XRL utilizing an explainable model such as an XNN, INN or XTT may have multiple inputs corresponding to one or more tasks that are associated with one or more input features and have multiple outputs corresponding to the outputs for those tasks. The semantic notion of tasks in an XNN/INN context is merely implemented by designating some input features as task identifiers and task meta-data input features without needing any change in the XNN/INN structure itself. The hierarchical partition structure, which may be a tree, graph, hypergraph, or simplicial complex structure, allows for crossover between different knowledge learnt for the different tasks to occur efficiently. Such crossover occurs within the XNN/INN prediction network, which caters for feature interactions within the hierarchical partition structure. The XNN/INN conditional network may be used to select, orchestrate and multiplex the correct path trace through the partition structure linking the task, its associated inputs, and associated outputs. It is contemplated that a denser or sparse XNN/INN may be utilized to implement parts of the partition structure in an energy efficient manner. It is further contemplated that a distributed XNN/INN or a DEA may be used to implement parts of the partition structure in a practical manner. It is further contemplated that an XTT may additionally utilize its attention mechanism to help generalize and optimize multiple task-input-output crossover and transfer learning.

In an exemplary embodiment, an XRL agent may be implemented together with an XAED and/or XGAN system to generate realistic environmental simulations and/or provide experience learning data samples for the XRL agent. It is further contemplated that such an exemplary embodiment may be utilized in the creation of virtual reality simulations, augmented reality simulations, virtual collaboration spaces, educational spaces, training environments, and metaverses. It is further contemplated that such generated data samples may be tagged with a secure traceable digital code, distributed ledger entry or non-fungible token (NFT).

Model explanations, justifications, and the prediction outputs, produced by the components of the XRL, may be used as input to tune the optimality metric of the XRL. In an exemplary embodiment, an XRL uses the model explanations, justifications, and the prediction outputs as input to tune the policy of the XRL using the bias optimality metric.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for providing an explainable agent for estimating an explainable reward function of a reinforcement learning program and managing a controller according to an estimate of the explainable reward function, comprising:
    acquiring, from one or more sensors configured to monitor an external environment, an observed space comprising one or more states and one or more actions, and, with the reinforcement learning program, modeling the observed space as a plurality of explainable state-action pairs;
    forming one or more explainable models comprising a simulated environment and a reward function, and integrating at least one of the one or more explainable models with a controller interface associated with the controller;
    returning at least one explanation from at least one of the one or more explainable models corresponding to at least one state and at least one reward;
    generating an explanation scaffolding;
    applying a filter or transform to convert the explanation scaffolding into an interpretation scaffolding; and
    identifying, based on the at least one state, at least one state-action pair, and executing at least one action in the external environment via the controller via the controller interface corresponding to the at least one state-action pair, based on the at least one explanation, wherein the at least one state-action pair is maintained as a constant connection point after selecting the at least one state until after the at least one action is performed.

2. The method for providing the explainable agent of claim 1, wherein the explanation indicates one or more actions or one or more decisions of the at least one explainable model.

3. The method for providing the explainable agent of claim 1, wherein one or more constraints in the reward function comprise at least one of: a real-world physics model, an experimentally derived knowledge base, a knowledge base, a knowledge graph, a taxonomy, an ontology, a symbolic rule, a set of Bayesian estimates, a set of expert-derived samples, a set of simulator-derived samples, a set of environment-derived samples, and a simulator constraint model with statistical, causal, symbolic and neuro-symbolic constraints.

4. The method for providing the explainable agent of claim 1, further comprising identifying, from the observed space, one or more irreversible states and one or more reversible states, a range, a cost, a reward, and an impact, or a consequence of executing one or more states.

5. The method for providing the explainable agent of claim 1, wherein the one or more explainable models comprise an iterative Monte Carlo Search Tree (MCST) policy, wherein the MCST policy is configured to minimize an error between a predicted policy and an observed policy, wherein the predicted policy comprises a plurality of value targets and rewards obtained from the explainable model, and the observed policy comprises one or more value targets and rewards identified from the observed space, wherein the MCST policy is configured to provide plausibility checks.

6. The method for providing the explainable agent of claim 1, wherein the one or more explainable models are implemented across a distributed explainable architecture, wherein each of the one or more explainable models is trained and operated independently.

7. The method for providing the explainable agent of claim 1, wherein an explainable model in the one or more explainable models implements an audit system log, and wherein the explainable model is implemented and verified by on a combination of systems based on one or more of the Temporal Logic of Actions, Abstract Machine Notation, Petri Nets, and Computation Tree Logic and further comprising storing the audit system log on a system of record, distributed ledger technology, or a tamper-proof and traceable database, wherein the audit system log is configured to preserve personal data and information with respect to data privacy using differential, secure multi-party computation, federated, and homomorphic solutions.

8. The method for providing the explainable agent of claim 1, wherein an explainable model in the one or more explainable models is represented by a Resource Description Framework (RDF) tree, RDF graph, hypergraph structure or a simplicial complex.

9. The method for providing the explainable agent of claim 1, wherein the observed space comprises input data comprising one or more of 2D data, 3D data, multi-dimensional data arrays, transactional data, time series, digitized samples, sensor data, image data, hyper-spectral data, natural language text, video data, audio data, haptic data, LIDAR data, RADAR data, SONAR data, and navigational data, and wherein one or more datapoints have an associated label indicating an output value or classification for the datapoints or for a continuous or non-continuous interval of datapoints;

wherein the observed space is configured to generate one or more realistic environmental simulations comprising one or more virtual reality simulations, augmented reality simulations, virtual collaboration spaces, educational spaces, training environments, and metaverses;

wherein the generated one or more realistic environmental simulations provide data samples to said at least one XRL agent in relation to the environment for experience learning; and wherein the data samples are processed with at least one secure traceable digital code, distributed ledger entry, or non-fungible token.

10. The method for providing the explainable agent of claim 1, wherein an explainable model in the one or more explainable models is implemented on a hardware comprising at least one of: a flexible architectures or field programmable gate array, a static architecture or application specific integrated circuit, analog or digital electronics, photo-electronics, optical processors, neuromorphic architectures, spintronics, or memristors, discrete computing components, spiking neurons, robotic hardware, autonomous vehicles, industrial control hardware, or quantum computing hardware, and further comprising applying a quantization or hardware-oriented compression technique on the hardware.

11. The method for providing the explainable agent of claim 1, wherein the one or more explainable models implement an explainable generative adversarial imitation learning method on an explainable generative adversarial network to train an occupancy measure of a policy to be as close as possible to an occupancy measure of a policy of an expert.

12. The method for providing the explainable agent of claim 1, further comprising injecting a human-defined rule into the one or more explainable models, wherein the human-defined rule comprises a fixed modification to one or more of the internal coefficients and verifying the model interpretation against a specification of desired behavior comprising at least one safety assurance, and wherein the human-defined rule is static.

13. The method for providing the explainable agent of claim 1, wherein one or more rules from the one or more explainable models comprise quantum extensions configured to interpret quantum annealing effects using one or more qubit states, qubit basis states, mixed states, Ancilla bits, and wherein the one or more explainable models comprise at least one quantum controlled not gate, controlled-swap gate, Ising gate, Pauli gate, Hadamard gate, or Toffoli gate.

14. The method for providing the explainable agent of claim 1, further comprising using at least a selection of the one or more explainable models to form an explanation structure model (ESM) comprising the at least the selection of the one or more explainable models, a statistical structural model which models a plurality of statistical relationships, a causal structural model (CSM), the CSM modeling a plurality of causal relationships, and a symbolic structural model, the symbolic structural model modeling a plurality of symbolic and logical relationships formed as one or more rules and/or symbolic logic, wherein one or more statistical, causal, symbolic, or logical relationships are modeled as an anchor component, and further comprising implementing an explanation interpretation generation system (EIGS) and/or an explanation filter interpretation configured to output an explanation output template (EOT).

15. The method for providing the explainable agent of claim 1, further comprising implementing one or more action and policy rules using at least one digital-analogue hybrid system, optical system, quantum entangled system, bio-electrical interface, or bio-mechanical interface.

16. The method for providing the explainable agent of claim 1, wherein the one or more explainable models implement one or more workflows, process flows, Fast Weights, Robotic Process Automation (RPA), Decision Support System (DSS), Data Lake, Root Cause Analysis (RCA), Goal-Plan-Action (GPA) system, process description, state-transition charts, Petri networks, electronic circuits, logic gates, optical circuits, digital-analogue hybrid circuits, bio-mechanical interfaces, bio-electrical interface, and quantum circuits.

17. The method for providing the explainable agent of claim 1, wherein the at least one explanation further comprises at least one of a basic interpretation, an explanatory interpretation, and a meta-explanatory interpretation, and a neuro-symbolic conditional constraint with a rate of activations in order to constrain the rate of trigger activation with respect to an explainable model, wherein the neuro-symbolic conditional constraint is implemented as symbolic rules or system of symbolic expressions, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L2 functions, fractal-based transforms, Hadamard transforms, Type 1 and Type 2 fuzzy logics, difference analyses, and knowledge graph networks.

18. The method for providing the explainable agent of claim 1, wherein the one or more explainable models further comprise one or more conditional constraints configured to trigger one or more of the actions, and wherein the one or more explainable models forms a behavioral model or a behavioral model hierarchy.

19. The method for providing the explainable agent of claim 1, further comprising:

forming a predictive function from the one or more explainable models and observed space;

using the predictive function, predicting one or more future states corresponding to one or more states;

comparing the predicted future states with one or more of the observed states to calculate a plausibility value.

20. The method for providing the explainable agent of claim 1, further comprising predicting an expected behavior of one or more other agents or models for at least one of:

self-training against a simulated environment, self-training using interventional actions against a simulated environment, active learning against a live environment, active learning using interventional actions against a live environment, mimic learning, and experience learning.

21. The method for providing the explainable agent of claim 1, further comprising predicting, using one of the one or more explainable models, an expected behavior of one other explainable model from the one or more explainable models, and making independent decisions and optimizations based on a combination of local and global environments and explanations.

22. The method for providing the explainable agent of claim 1, wherein the one or more explainable models further comprise a Markov Decision Process or Partially Observable Markov Decision Process.

23. The method for providing the explainable agent of claim 1, wherein each explainable state-action pair identifies a state, an explanation of the state, and an associated action based on the explanation of the state, wherein the at least one action corresponding to the at least one state-action pair is identified based on an explanation associated with one or more states.

24. The method for providing the explainable agent of claim 1, wherein the explanations comprise scenario-based explanations associated with a what-if, what-if-not, counterfactual, but-for, and conditional scenarios for generating explained strategies and scenario-based explanations in accordance with the actions and decisions of the explainable agent; and/or
  wherein the explainable agent is trained to learn suggested actions for a given user with a specific context leading to a change in decision outcome and minimizing total cost of actions, wherein the total costs is an amalgamation of one or more costs associated with each variable based on a metric for each type of cost; and/or
  wherein the scenario-based explanations in relation to use of a nearest-neighbor method, Identify-Assess-Recommend-Resolve (IAR) framework, Multiple Objective Optimization (MOO), Pareto Front Method, Particle Swarm Optimization (PSO), Genetic Algorithms (GA), Bayesian Optimization, Evolutionary Strategies, Gradient Descent techniques and Monte Carlo Simulation (MCS).

25. The method for providing the explainable agent of claim 1, further comprising providing an experience dataset comprising sequential input data, and identifying a connection between a data point in the sequential input data and a state and/or action.

26. The method for providing the explainable agent of claim 1, further comprising forming a policy, the policy representing an explainable mapping of states and corresponding actions;
  monitoring another model in order to detect an anomalous behavior, detecting one or more instances of data drift and Out-of-Distribution (OOD) instances, detecting a plurality of abnormal deviations from one or more nominal operational cycles, analyzing and assessing a behavior of the one or more models under OOD and anomalous instances, variation, deviation, performance and resource usage monitoring, Nyquist plots, Bode plots, phase-space, and an industry-specific monitoring activity.

27. The method for providing the explainable agent of claim 1, further comprising updating the plurality of explainable state-action pairs by applying at least one of a Bellman equation, an explainable multi-stage optimization technique, an explainable temporal difference optimization technique, and an explainable multi-stage dynamic programming technique.

28. The method for providing the explainable agent of claim 1, further comprising returning at least one of: an explainable action, or an interpretation corresponding to at least one of a state, a reward and one or more partitions in a partition structure, by applying a combination of abductive logic, inductive logic, deductive logic and causal logic.

29. The method for providing the explainable agent of claim 1, further comprising sending the input data to a model, wherein the model is explainable or interpretable and wherein the model is part of an explanation interpretation generation system, and identifying at least one of an answer, a model explanation, and a justification of the answer; and
  iteratively processing and evaluating the explanation scaffolding to generate a candidate explanation.

30. The method for providing the explainable agent of claim 1, wherein an explainable architecture is implemented to represent an explainable Bellman equation defining a Q-value, wherein the explainable state-action pairs and a Bellman equation are used to form the explainable Bellman equation, and wherein the Q-value is minimized by comparing the Q-value with a static scalar value or a dynamic value computed from a difference function based on the Q-value and one or more Q-learning weights associated with the explainable Bellman equation, and wherein a regularization weight is applied to the explainable Bellman equation.

* * * * *